US011905894B2

(12) United States Patent
Wischstadt et al.

(10) Patent No.: US 11,905,894 B2
(45) Date of Patent: Feb. 20, 2024

(54) CARBON MONOXIDE DETECTING SYSTEM FOR INTERNAL COMBUSTION ENGINE-BASED MACHINES

(71) Applicant: Generac Power Systems, Inc., Waukesha, WI (US)

(72) Inventors: Gregory A. Wischstadt, Wales, WI (US); Adam M. Schroeder, Stoughton, WI (US); Mitchell L. Horn, Hartland, WI (US); Brandon Schmidt, Sun Prairie, WI (US); Kevin Cole, Janesville, WI (US); Tod R. Tesch, Oconomowoc, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 17/572,428

(22) Filed: Jan. 10, 2022

(65) Prior Publication Data

US 2022/0243672 A1 Aug. 4, 2022

Related U.S. Application Data

(63) Continuation of application No. 16/707,621, filed on Dec. 9, 2019, now Pat. No. 11,248,540, which is a (Continued)

(51) Int. Cl.
*F02D 17/04* (2006.01)
*F02D 41/22* (2006.01)
(Continued)

(52) U.S. Cl.
CPC ............ *F02D 17/04* (2013.01); *F02B 63/048* (2013.01); *F02B 77/086* (2013.01);
(Continued)

(58) Field of Classification Search
CPC .... F02D 17/04; F02D 41/042; F02D 41/1453; F02D 41/22; F02D 41/222; F02B 63/048; F02B 77/086
See application file for complete search history.

(56) References Cited

U.S. PATENT DOCUMENTS 202,906 A 4/1878 Westwood
202,912 A 4/1878 Wood
(Continued)

FOREIGN PATENT DOCUMENTS

CN 1386164 A 12/2002
DE 02015112105 A1 1/2017
(Continued)

OTHER PUBLICATIONS

Briggs & Straton Corporation, U.S. Appl. No. 62/453,823, filed Feb. 2, 2017, Portable Generator Including Carbon Monoxide Detector.
(Continued)

*Primary Examiner* — Joseph J Dallo
(74) *Attorney, Agent, or Firm* — Merchant & Gould P.C.

(57) ABSTRACT

An internal combustion engine-based system includes an internal combustion engine. The internal combustion engine-based system includes an engine interrupt connected to the engine. The engine interrupt is configured to selectively stop the operation of the engine. The internal combustion engine-based system includes a controller in communication with the engine interrupt. The internal combustion engine-based system includes a carbon monoxide detector in communication with the controller. The controller uses the engine interrupt to stop the operation of the engine when the carbon monoxide detector provides the controller with signals that are representative of a carbon monoxide level proximate the internal combustion engine
(Continued)

that together form a trend of building carbon monoxide amounts over a set time interval.

26 Claims, 13 Drawing Sheets

Related U.S. Application Data continuation of application No. 15/942,203, filed on Mar. 30, 2018, now Pat. No. 10,563,596.

(60) Provisional application No. 62/480,089, filed on Mar. 31, 2017.

(51) Int. Cl.

| | |
|---|---|
| ***F02D 41/04*** | (2006.01) |
| ***F02D 41/14*** | (2006.01) |
| ***F02B 63/04*** | (2006.01) |
| ***F02B 77/08*** | (2006.01) |

(52) U.S. Cl.

CPC ....... *F02D 41/042* (2013.01); *F02D 41/1453* (2013.01); *F02D 41/22* (2013.01); *F02D 41/222* (2013.01)

(56) References Cited

U.S. PATENT DOCUMENTS

| | | | |
|---|---|---|---|
| 208,655 | A | 10/1878 | West |
| 228,132 | A | 5/1880 | Smith et al. |
| 319,207 | A | 6/1885 | Doolittle |
| 3,842,600 | A | 10/1974 | Nakajima et al. |
| 4,221,206 | A | 9/1980 | Haas |
| 5,049,861 | A | 9/1991 | Grace et al. |
| 5,199,397 | A | 4/1993 | Shelef et al. |
| 5,576,739 | A | 11/1996 | Murphy |
| 5,712,052 | A | 1/1998 | Kawatsu |
| 5,925,476 | A | 7/1999 | Kawatsu |
| 7,040,544 | B2 | 5/2006 | Guyer |
| 7,183,933 | B2 | 2/2007 | Dzurko et al. |
| 7,305,291 | B2 | 12/2007 | Koenig et al. |
| 7,314,044 | B2 | 1/2008 | Westerbeke |
| 7,692,409 | B2 | 4/2010 | Schaper et al. |
| 8,054,188 | B2 | 11/2011 | Harkins et al. |
| 8,103,429 | B2 | 1/2012 | Sivasubramaniam et al. |
| 8,415,829 | B2 | 4/2013 | Di Cristofaro |
| 8,791,828 | B2 | 7/2014 | Harkins et al. |
| 8,847,417 | B2 | 9/2014 | Kaiser |
| 9,058,739 | B2 | 6/2015 | Sid |
| 9,175,601 | B2 | 11/2015 | Markoski |
| 9,221,456 | B2 | 12/2015 | Wright et al. |
| 9,403,529 | B2 | 8/2016 | Liu et al. |
| 9,450,450 | B2 | 9/2016 | Markoski |
| 9,593,632 | B2 | 3/2017 | Ge |
| 9,604,026 | B2 | 3/2017 | Gribb et al. |
| 9,664,094 | B2 | 5/2017 | Devarakonda |
| 9,664,594 | B2 | 5/2017 | Makled et al. |
| 9,670,854 | B2 | 6/2017 | Jankovic |
| 9,685,672 | B2 | 6/2017 | Iiyama et al. |
| 9,757,531 | B2 | 9/2017 | Rogers, Jr. |
| 9,791,154 | B2 | 10/2017 | Yukimasa et al. |
| 9,919,638 | B2 | 3/2018 | Brand |
| 9,982,471 | B2 | 5/2018 | Ozkan |
| 9,995,248 | B2 | 6/2018 | Markoski |
| 10,060,827 | B2 | 8/2018 | Schnell et al. |
| 10,097,122 | B1 | 10/2018 | Schwulst et al. |
| 10,202,906 | B2 | 2/2019 | Morisaki et al. |
| 10,202,912 | B2 | 2/2019 | Glugla et al. |
| 10,208,655 | B2 | 2/2019 | Liu et al. |
| 10,228,132 | B2 | 3/2019 | Radl |
| 10,319,207 | B1 | 6/2019 | Janscha et al. |
| 10,475,319 | B2 | 11/2019 | Janscha et al. |
| 10,563,596 | B2 | 2/2020 | Wischstadt et al. |
| 11,067,556 | B1 * | 7/2021 | Janscha ................ G01N 33/004 |
| 2002/0179051 | A1 | 12/2002 | Sauler et al. |
| 2003/0091430 | A1 | 5/2003 | Mulera et al. |
| 2007/0085692 | A1 | 4/2007 | Grant et al. |
| 2011/0062725 | A1 | 3/2011 | Cristoforo |
| 2011/0063101 | A1 | 3/2011 | Cristoforo |
| 2011/0254370 | A1 | 10/2011 | Wischstadt et al. |
| 2012/0016546 | A1 | 1/2012 | Nilssen et al. |
| 2013/0189599 | A1 | 7/2013 | Tatsui et al. |
| 2014/0116870 | A1 | 5/2014 | Kamen et al. |
| 2014/0230815 | A1 | 8/2014 | Gribb et al. |
| 2014/0290251 | A1 | 10/2014 | Sugasawa et al. |
| 2015/0057912 | A1 | 2/2015 | Ortmann et al. |
| 2015/0096352 | A1 | 4/2015 | Peterson et al. |
| 2015/0243151 | A1 | 8/2015 | Wright et al. |
| 2015/0300172 | A1 * | 10/2015 | Haskew .................. G06F 17/10 700/275 |
| 2016/0087554 | A1 | 3/2016 | Nohra |
| 2016/0298567 | A1 | 10/2016 | Zeng et al. |
| 2017/0023630 | A1 | 1/2017 | Zettler et al. |
| 2017/0110003 | A1 | 4/2017 | Barson |
| 2017/0193789 | A1 | 7/2017 | Economy et al. |
| 2017/0298890 | A1 | 10/2017 | King |
| 2017/0335781 | A1 | 11/2017 | Augusty |
| 2018/0291822 | A1 | 10/2018 | Wischstadt et al. |
| 2018/0294982 | A1 | 10/2018 | Boemi et al. |
| 2018/0348182 | A1 | 12/2018 | Sugar |
| 2018/0363542 | A1 | 12/2018 | Pimentel |
| 2019/0040791 | A1 | 2/2019 | Ulrey et al. |
| 2019/0078586 | A1 | 3/2019 | Zeng et al. |
| 2019/0251817 | A1 | 8/2019 | Janscha et al. |
| 2020/0005617 | A1 | 1/2020 | Janscha et al. |
| 2020/0083828 | A1 * | 3/2020 | Willer ................... F02B 63/047 |
| 2021/0341443 | A1 | 11/2021 | Janscha et al. |
| 2022/0090545 | A1 * | 3/2022 | Willer ...................... G01V 8/12 |

FOREIGN PATENT DOCUMENTS

| | | | | |
|---|---|---|---|---|
| GB | 2270122 | A | 3/1994 | |
| GB | 2270122 | B | 3/1996 | |
| WO | WO-2004011373 | A2 * | 2/2004 | ........... C01C 3/0245 |
| WO | WO-2010031942 | A2 * | 3/2010 | ............. H02K 11/20 |
| WO | 012056190 | A1 | 5/2012 | |
| WO | 2017193689 | A1 | 11/2017 | |
| WO | 2017204278 | A1 | 11/2017 | |
| WO | 2018173620 | A1 | 9/2018 | |
| WO | WO-2018183879 | A1 * | 10/2018 | ............ F02B 63/048 |

OTHER PUBLICATIONS

Briggs & Straton Corporation, U.S. Appl. No. 62/455,373, filed Feb. 2, 2017, Portable Generator Including Carbon Monoxide Detector.

Invitation to Pay Additional Fees for International Application No. PCT/US2018/025447 dated Jul. 2, 2018 (13 pgs).

International Search Report and Written Opinion for International Application No. PCT/US2018/025447 dated Aug. 27, 2018 (19 pgs).

* cited by examiner

CARBON MONOXIDE DETECTING SYSTEM FOR INTERNAL COMBUSTION ENGINE-BASED MACHINES

CROSS-REFERENCE TO RELATED APPLICATION

This application is a continuation of U.S. application Ser. No. 16/707,621, filed on Dec. 9, 2019, which is a continuation of U.S. application Ser. No. 15/942,203, filed on Mar. 30, 2018, now U.S. Pat. No. 10,563,596, which claims priority to U.S. Provisional Application No. 62/480,089, filed on Mar. 31, 2017, the disclosures of which are hereby incorporated by reference in their entireties. To the extent appropriate, a claim of priority is made to each of the above-disclosed applications.

BACKGROUND

Carbon monoxide is a colorless and odorless toxic gas, often dubbed the "silent killer." Carbon monoxide is created by the incomplete combustion of materials containing carbon. For example, carbon monoxide is created when burning gasoline, propane, coal, wood, etc. Because the gas is odorless and colorless, humans are often unaware of its presence until it is too late, often leading to fatal poisonings. Because of this, it is important to vigilantly monitor the presence of the gas using a carbon monoxide detector. A build-up of the gas is common in enclosed spaces where there is not proper ventilation. Many carbon monoxide detectors are statically mounted and therefore make it difficult to properly monitor every enclosed area. Further, accidental poisonings often occur when portable, internal combustion engine-based machines are moved into, and operated in, an enclosed/semi-enclosed space, such as a garage or basement room. These machines output carbon monoxide in the form of exhaust, and due to their portability, are susceptible to being the source for accidental poisonings. Therefore, improvements to carbon monoxide detectors are needed, specifically with regard to portable, internal combustion engine-based machines.

SUMMARY

The present disclosure relates generally to a carbon monoxide detection system for an internal combustion based machine. In one possible configuration, and by non-limiting example, the portable generator utilizes an on-board carbon monoxide detector to automatically shutdown the operations of the generator when a carbon monoxide build-up is sensed.

In one aspect of the present disclosure, an internal combustion engine-based system is disclosed. The internal combustion engine-based system includes an internal combustion engine. The internal combustion engine-based system includes an engine interrupt connected to the engine. The engine interrupt is configured to selectively stop the operation of the engine. The internal combustion engine-based system includes a controller in communication with the engine interrupt. The internal combustion engine-based system includes a carbon monoxide detector in communication with the controller. The controller uses the engine interrupt to stop the operation of the engine when the carbon monoxide detector provides the controller with signals that are representative of a carbon monoxide level proximate the internal combustion engine that together form a trend of building carbon monoxide amounts over a set time interval.

In another aspect of the present disclosure, a method of monitoring a carbon monoxide sensor is disclosed. The method includes monitoring readings from a carbon monoxide detector over a time interval at a controller. The method includes comparing the readings from the carbon monoxide detector to a minimum noise threshold. The method includes determining if the readings are greater than the minimum noise threshold. The method includes activating a fault signal sent by a controller if the readings are not greater than the minimum noise threshold.

In another aspect of the present disclosure, an internal combustion engine-based system is disclosed. The internal combustion engine-based system includes an internal combustion engine connected to a frame. The internal combustion engine-based system includes an engine interrupt connected to the engine. The engine interrupt is configured to selectively stop the operation of the engine. The internal combustion engine-based system includes a controller in communication with the engine interrupt. The internal combustion engine-based system includes a carbon monoxide detector attached to the frame and in communication with the controller. The carbon monoxide detector is configured to communicate carbon monoxide values that are representative of the carbon monoxide levels in the environment immediately surrounding the internal combustion engine. The internal combustion engine-based system includes at least one additional sensor in communication with the controller. The at least one additional sensor is one of a group comprising a temperature sensor, a humidity sensor, a proximity sensor, an accelerometer, and/or a timer. The controller determines if the internal combustion engine is exposed to an undesirable environment based at least in part on the signals received from the at least one additional sensor.

In another aspect of the present disclosure, a method of operating an internal combustion engine-based system is disclosed. The method includes detecting a carbon monoxide level proximate an internal combustion engine over a period of time using a carbon monoxide detector. The method includes determining that at least a rate of change of the carbon monoxide level from the carbon monoxide detector exceeds at least one predetermined shutoff threshold. The method includes activating a shutdown action when the at least the rate of change of the carbon monoxide level from the carbon monoxide detector exceeds the at least one predetermined shutoff threshold. The shutdown action is configured to stop operation of the internal combustion engine.

In another aspect of the present disclosure, a data storage device for storing data instructions that, when executed by a controller of a carbon monoxide detector, causes the controller to receive an indication of a carbon monoxide level over a period of time from a carbon monoxide detector proximate an internal combustion engine. The data storage device causes the controller to determine whether a rate of change of the carbon monoxide level from the carbon monoxide detector exceeds at least one predetermined shutoff threshold. The data storage device causes the controller to activate a shutdown action when the at least the rate of change of the carbon monoxide level from the carbon monoxide detector exceeds the at least one predetermined shutoff threshold. In some examples, the data storage device determines whether a magnitude of the carbon monoxide level from the carbon monoxide detector exceeds at least a second predetermined shutoff threshold. In some examples, the data storage device activates a shutdown action when the at least the magnitude of the carbon monoxide level from the carbon monoxide detector exceeds at least the second predetermined shutoff threshold.

In another aspect of the present disclosure, a system is disclosed. The system includes a carbon monoxide detector that includes a controller and a data storage device. The data storage device for storing data instructions that, when executed by a controller of a carbon monoxide detector, causes the controller to receive an indication of a carbon monoxide level over a period of time from a carbon monoxide detector proximate an internal combustion engine. The data storage device causes the controller to determine whether a rate of change of the carbon monoxide level from the carbon monoxide detector exceeds at least one predetermined shutoff threshold. The data storage device causes the controller to activate a shutdown action when the at least the rate of change of the carbon monoxide level from the carbon monoxide detector exceeds the at least one predetermined shutoff threshold.

In another aspect of the present disclosure, an internal combustion engine-based system is disclosed. The internal combustion engine-based system includes an internal combustion engine and a system that includes a carbon monoxide detector that includes a controller and a data storage device. The data storage device for storing data instructions that, when executed by a controller of a carbon monoxide detector, causes the controller to receive an indication of a carbon monoxide level over a period of time from a carbon monoxide detector proximate an internal combustion engine. The data storage device causes the controller to determine whether a rate of change of the carbon monoxide level from the carbon monoxide detector exceeds at least one predetermined shutoff threshold. The data storage device causes the controller to activate a shutdown action when the at least the rate of change of the carbon monoxide level from the carbon monoxide detector exceeds the at least one predetermined shutoff threshold. The shutdown action is configured to stop the operation of the internal combustion engine.

In another aspect of the present disclosure, a generator is disclosed. The generator includes an internal combustion engine that generates mechanical power. The generator includes an alternator that receives the mechanical power from the generator and transforms at least a majority of the mechanical power into electrical energy. The generator includes an output interface that provides the electrical energy to an external device for powering the external device. The generator includes a controller in communication with the internal combustion engine. The generator includes a carbon monoxide detector in communication with the controller. The carbon monoxide detector indicates a carbon monoxide level. The controller activates a shutdown action to stop the operation of the internal combustion engine when the carbon monoxide indicates a trend of building carbon monoxide level over a set time interval.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
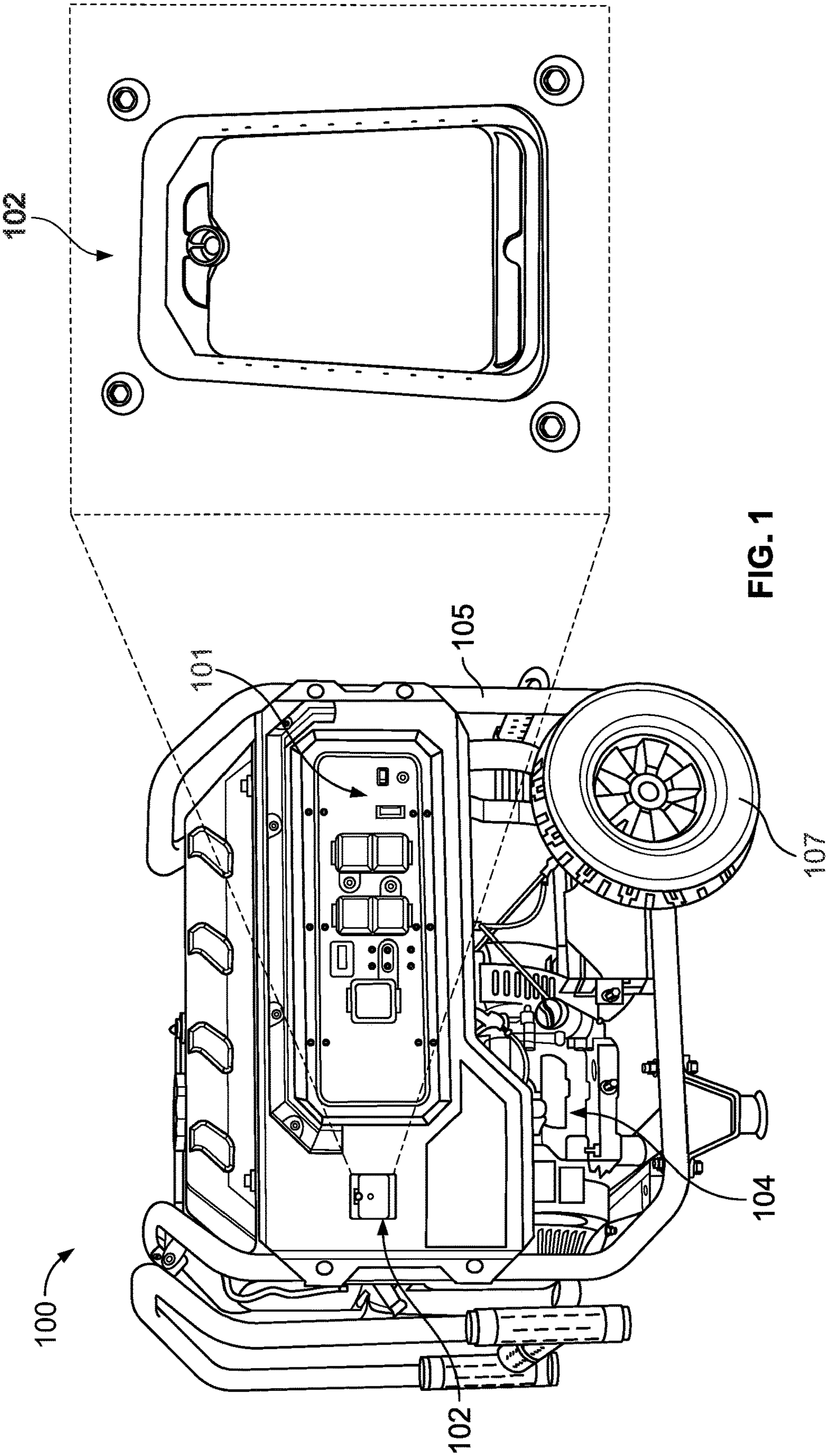
FIG. 1 illustrates a schematic isometric view of a generator and a carbon monoxide detector, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 shows a generator 100 that includes a carbon monoxide (CO) detector 102 connected thereto. While a generator 100 is used herein as an example internal combustion engine machine (specifically a gas-powered machine), it is considered within the scope of the present disclosure that a wide variety of internal combustion engine machines can be used with the CO detector 102. For example, these machines can include, but are not limited to, pressure washers, compressors, pumps, wood splitters, etc.

The generator 100 and CO detector 102 operate together so that the generator 100 is configured to automatically turn off when in an undesirable, non-ventilated environment where CO build-up is occurring. Such an environment could be inside a dwelling, a garage, or a semi-enclosed space with poor ventilation.

In some examples, the primary purpose of the generator 100 is to generate electricity. In some examples, the generator 100 produces mechanical power and transforms at least the majority of the mechanical power to electrical energy. In some examples, the generator includes an output interface 101 that provides the electrical energy created by the generator 100 to an external device for powering the external device.

In some examples, the generator 100 is a portable generator and can be relatively easily relocated. In some examples, the generator has wheels 107. In some examples, a Generac XT8000 Portable Generator is used as the generator 100. In some examples, the generator is a stationary generator. In some examples, the generator 100 includes, at least, an engine 104 mounted to a frame 105.

The CO detector 102 can be mounted to and/or integrated with the generator 100. In some examples, the CO detector 102 is tamper-proof to prevent the generator 100 from operating if the CO detector 102 is tampered with (i.e., removed or disassembled). In other examples, the CO detector 102 is removable from the generator 100. In some examples, the CO detector is mounted to the generator 100 at a point spaced away from the exhaust output (not shown).

In some examples, the CO detector 102 can be at least one of, but not limited to, an electrochemical sensor, a biomimetic sensor, a nondispersive infrared (NDIR) sensor, and a metal oxide semiconductor. The CO detector 102 is configured to measure the amount of CO, in parts per million, in the environment surrounding the CO detector 102 and generator 100.

Figure 2:
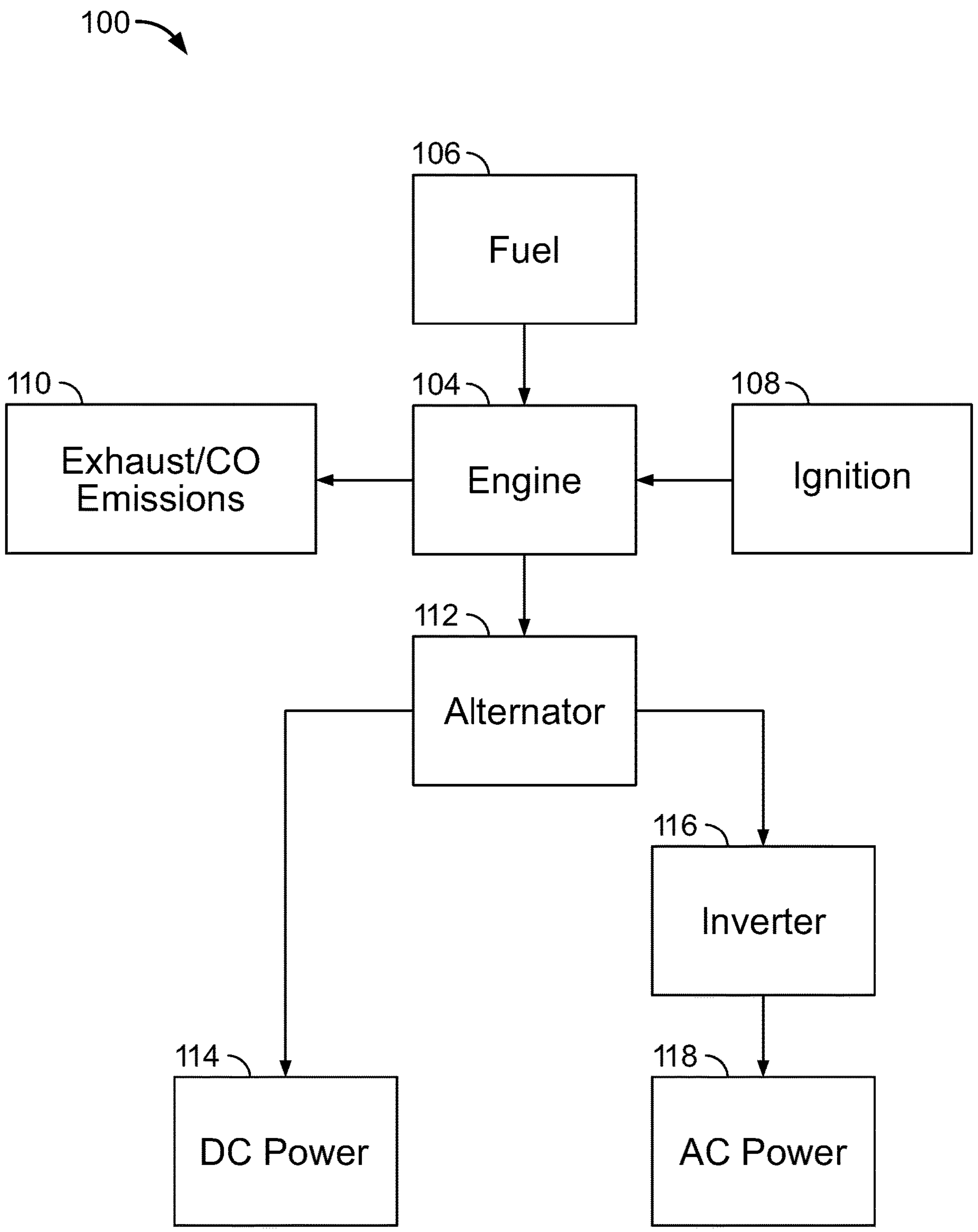
FIG. 2 illustrates a block diagram of an example of a generator operation, according to one embodiment of the present disclosure.

FIG. 2 shows a flowchart of the general operation of the generator 100. The generator 100 includes the engine 104 that is powered by fuel 106 (i.e., gasoline or diesel). In some examples, as the engine 104 is operated, the engine 104 draws electrical power from an ignition system 108. In some examples, the ignition system 108 can include an ignition magneto or battery. As the engine 104 operates, it outputs mechanical power and exhaust gases (including CO) 110, both by-products of the combustion process. The engine 104 mechanically powers an alternator 112, which transforms the engine 104's mechanical power to electrical power. The alternator 112 can output rectified DC power 114 directly, or with the help of an inverter 116, output AC power 118.

As noted above, in some examples, the CO detector 102 is in communication with the engine 104 to allow the CO detector 102 to prevent the operation of the engine 104 if the CO detector 102 has been tampered with. In some examples, the CO detector 102 communicates with the engine 104 via a controller 122. In some examples, the CO detector 102 communicates directly with the engine 104. In some examples, the CO detector 102 is in communication with a fuel delivery system (not shown) of the engine 104 to prevent fuel delivery to the engine in the event the CO detector 102 has been tampered with.

Figure 3:
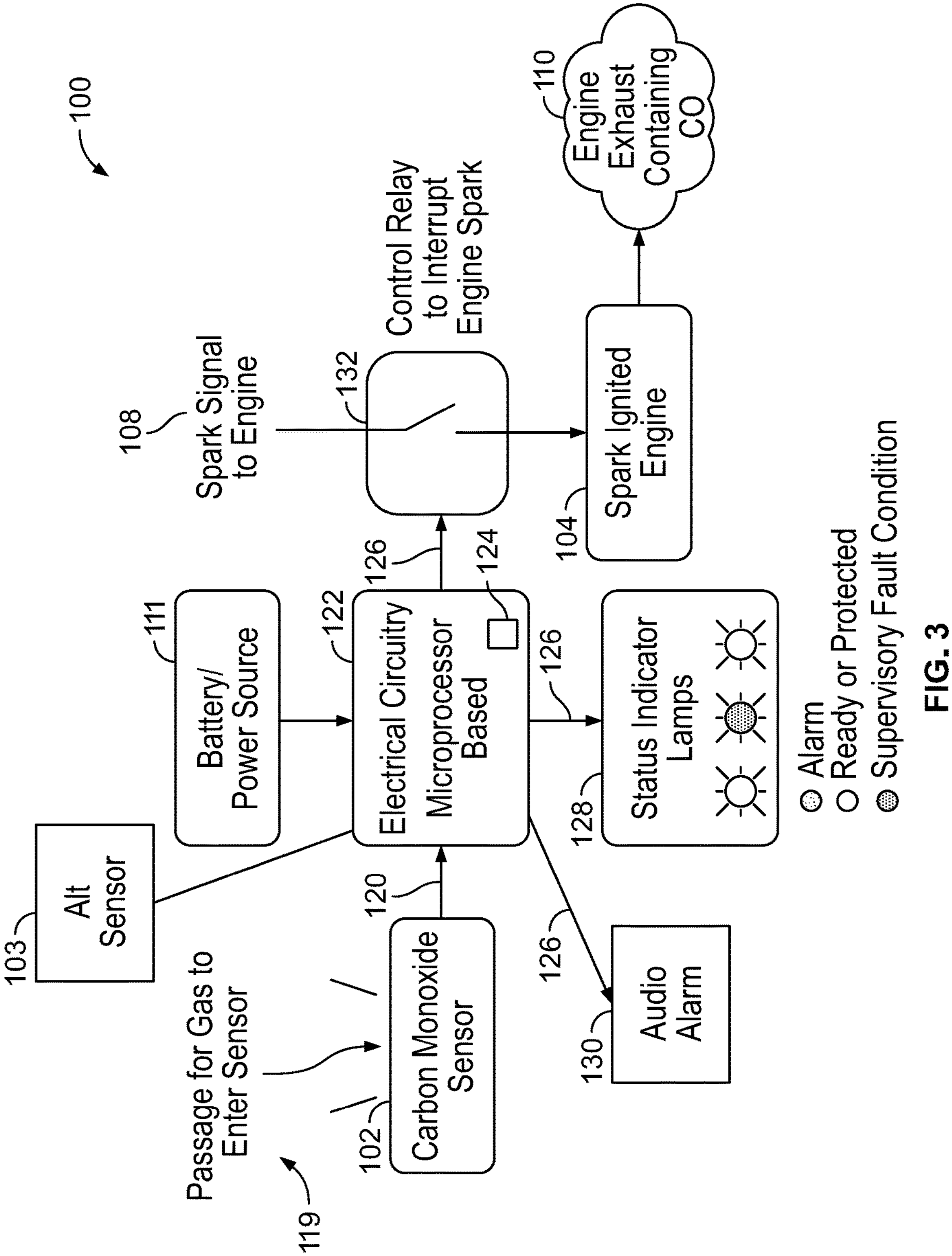
FIG. 3 illustrates a block diagram of the operation of the generator and the carbon monoxide detector of FIG. 1.

FIG. 3 shows a flow chart that depicts the communication of the CO detector 102 with the generator 100. The CO detector 102 is configured to be in communication with an environment 119 immediately surrounding the generator 100. In the depicted example, the CO detector 102 is a detector that outputs a signal 120 (i.e., data readings) representative of the environment 119 to the controller 122.

In some examples, the controller 122 is packaged with the CO detector 102 as a single unit. In other examples, the controller 122 is a component mounted separately to the generator 100. In some examples, the controller 122 includes a microprocessor 124 that is configured to process the signal 120 from the CO detector 102 and output a variety of signals 126. In some examples, the controller 122 can be powered by a battery 109, which can either be an on-board battery of the generator 100 or a separate battery connected thereto. In other examples, the controller 122 can be powered via the output from the alternator 112 and/or the ignition system 108. In some examples, the controller 122 can be generally powered via the AC output of the generator 100. In other examples, the controller 122 scavenges power from another electrical circuit in the generator 100.

The controller 122 is configured to output signals 126 to a visual status indicator 128, an audio alarm 130, and an engine interrupt circuit 132. The controller 122 is configured to analyze the signals 120 from the CO detector 102 and output a signal 126 based on such signals 120.

In some examples, the controller 122 is operable to execute a plurality of software instructions that, when executed by the controller 122, cause the generator 100 to implement the methods and otherwise operate and have functionality as described herein. The controller 122 may comprise a device commonly referred to as a microprocessor, central processing unit (CPU), digital signal processor (DSP), or other similar device and may be embodied as a standalone unit or as a device shared with components of the generator 100. The controller 122 may include memory for storing the software instructions or the generator 100 may further comprise a separate memory device for storing the software instructions that is electrically connected to the controller 122 for the bi-directional communication of the instructions, data, and signals therebetween. In other examples still, a proportional-integral-derivative (PID) type controller can be used in replacement to, or in conjunction with, the controller 122.

In some examples, the generator 100 includes an additional sensor 103 in communication with the controller and/or the CO detector 102. In some examples, the additional sensor 103 can provide additional signals to the controller 122 to aid in controlling the operation of the generator 100. The visual status indicator 128 provides an indicator light that can be representative of the operational status of both the CO detector 102 and the generator 100 in general. For example, colored lamps can represent certain operational statuses. For example, a green status light can represent that the CO detector 102 is operating correctly and the controller 122 has determined the signals 120 from the CO detector 102 are representative of a desirable environment. A yellow status light can be used to represent that there is a problem in the system, such as a malfunction, and the system should be supervised. A yellow status light can also be used to represent a decrease in the safety of the environment 119 if the controller 122 has determined the signals from the CO detector 102 are beginning to trend in an undesirable direction. A red status light can represent an alarm. The alarm can be tripped if there is a fatal malfunction in the system or if the controller 122 has determined the signals from the CO detector 102 represent an undesirable environment. It is considered within the scope of the present disclosure to utilize a variety of different colors to represent the statuses discussed above, or further additional statuses.

In some examples, the audio alarm 130 is configured to sound an audio alarm when the controller 122 has determined there has either been a fault or there is an actively undesirable environment. For example, the audio alarm 130 will sound when the visual indicator 128 indicates red. In some examples, the audio alarm 130 can sound a different alarm, such as a beep or a series of beeps, when controller 122 determines that the system is operating in a desirable environment or in a supervised state.

Further, the values of CO when both the visual 128 and audio alarms 130 can also be dynamically altered, either automatically by the controller 122 or manually by a user. In some examples, the controller 122 can use a predetermined, or measured, emission rate of the engine 104 to alter when the audio and/or visual alarms 128, 130 are activated. In some examples, the controller 122 can alter when the audio and/or visual alarms 128, 130 are activated based on historic values sensed at the CO detector 102. This can be advantageous in a confined space, such as a particular worksite, as it allows the controller 122 to become calibrated and more sensitive to changes in CO levels in an environment where relatively small CO level changes can have a potentially harmful impact (i.e., potentially limited ventilation).

The engine interrupt circuit 132 is configured to be in communication with the ignition system 108 of the engine 104. For example, the ignition system 108 of the engine 104 can provide electrical current to at least one spark plug (not shown) mounted within the engine 104. The spark plug facilitates combustion, and, therefore, operation of the engine 104. The engine interrupt circuit 132 is configured to interrupt the passage of electrical current between the ignition system 108 and the spark plug. In some examples, the engine interrupt circuit 132 can include a relay. In other examples, the engine interrupt circuit 132 allows the flow of electrical current to the spark plug so long as a signal 126 is received from the controller 122. (For example, see FIG. 11). In other examples still, the engine interrupt circuit 132 allows the flow of electrical current to the spark plug until the signal 126 is received from the controller 122. In some examples, the signal is a 3V signal from the controller 122.

In some examples, the engine interrupt circuit 132 is configured to operate in a powered state or a non-powered state. When in the powered state, the engine interrupt circuit 132 allows current to pass from the ignition system 108 to the engine 104 and to at least one spark plug. When in the non-powered state, the engine interrupt circuit 132 grounds the ignition system 108, and, therefore, prevents electrical current from passing to the at least one spark plug of the engine 104. When the engine interrupt circuit 132 is in the non-powered state, the operation of the engine 104 is terminated and cannot be restarted until the engine interrupt circuit 132 receives a signal 126 from the controller 122 to return it to the powered state (i.e., not grounded).

In some examples, the engine interrupt circuit 132 can be connected to the fuel system 106 of the generator 100. Similarly, the engine interrupt circuit 132 can operate to selectively provide the engine 104 with fuel. Specifically, when in the non-powered state, the engine interrupt circuit 132 would cause the engine 104 to fail to receive fuel and engine 104 would thereby cease operation. In some examples, the engine interrupt circuit 132 can be in communication with a fuel pump to selectively turn it on and off.

In some examples, the engine interrupt circuit 132 will ground the ignition system when in the non-powered state. Therefore, unless a power signal 126 is received from the controller 122, the engine interrupt circuit 132 will remain in the non-powered state and the ignition system 108 will fail to pass electrical current to the engine 104. This aids in preventing tampering with the system and also helps to prevent the engine from operating when there is a malfunction.

In some examples, the engine interrupt circuit 132 can also be used for other functions on the generator 100. For example, an oil sensor (not shown) can be in communication with the engine interrupt circuit 132 to cease the engine 104's operation when oil levels are below a predetermined threshold. In other examples, a temperature sensor (not shown) can be in communication with the engine interrupt circuit 132 to cease the engine 104's operation when the engine temperature exceeds a predetermined threshold.

If the controller 122 determines that the signals 120 from the CO detector 102 are representative of a desirable operating condition and environment 119, the controller 122 outputs a signal 126 to the visual status indicator 130 to indicate the system is ready and protected. Additionally, the controller 122 does not send a signal to the audio alarm 130 to sound an alarm. Further, in some examples, the controller 122 sends a power signal 126 to the engine interrupt circuit 132, thereby allowing the engine to start/continue operating.

If the controller 122 determines that the signals 120 from the CO detector 102 are representative of an undesirable operating condition and environment 119, in some examples, the controller 122 outputs a signal 126 to the visual status indicator 130 to indicate the system alarm. Additionally, the controller 122 activating a shutdown action. In some examples, the shutdown action includes the controller 122 signals the audio alarm 130 to sound an audio alarm. Further, in some examples, the shutdown action includes the controller 122 not sending a power signal 126 to the engine interrupt circuit 132 to put the engine interrupt circuit 132 in a non-powered state, thereby ceasing operation of the engine 104.

Figure 4:
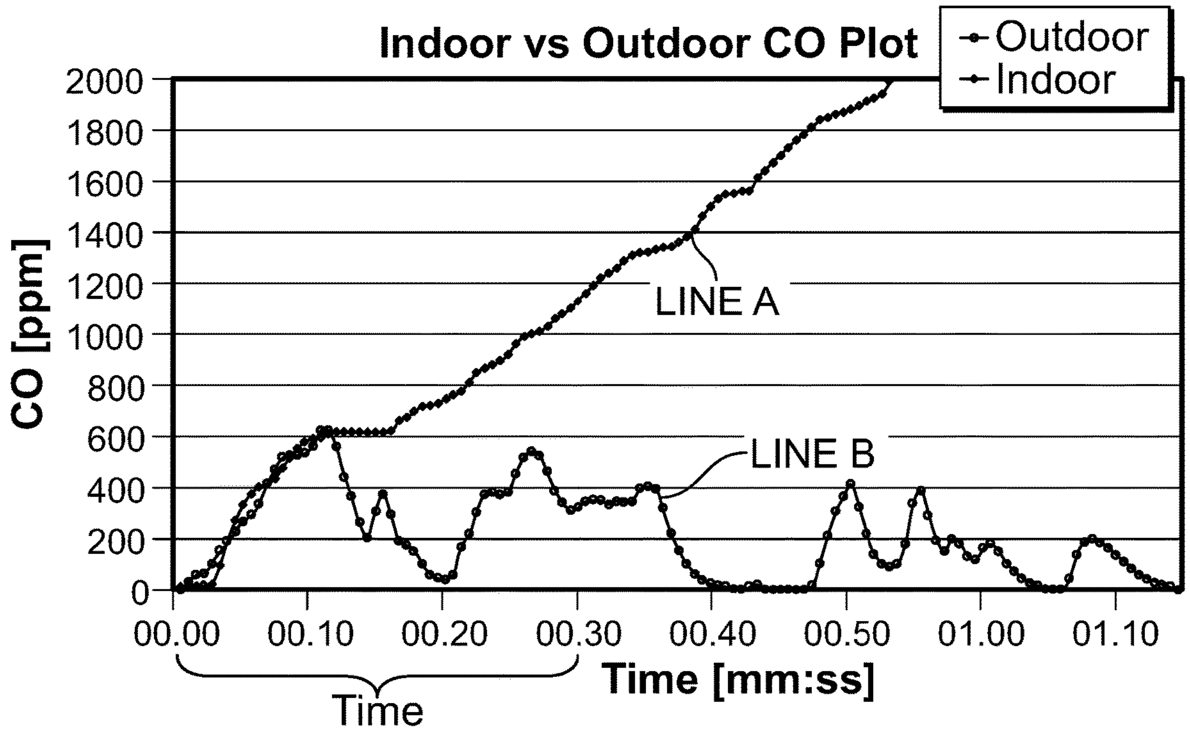
FIG. 4 illustrates an example of a data plot of sensed values provided to a controller by the carbon monoxide detector of FIG. 1.

FIG. 4 shows a chart that depicts example data provided to the controller 122 from the CO detector 102. The plot depicts CO levels in parts per million (ppm) over time. The first line, line A, and points thereon, represent an undesirable environment. The undesirable environment can be an indoor environment. Line B depicts CO levels that are expected in a desirable environment, such as a ventilated space or in an outdoor environment.

As can been seen in the chart, in the undesirable environment, over time, Line A continues at a positive slope, indicating a build-up of CO in the environment. Conversely, in the desirable environment, over time, Line B fluctuates between having a positive slope and a negative slope. This behavior is common in an outdoor environment as ventilation is typically inconsistent (i.e. wind or breezes). However, because there is not a consistent build-up over time, such fluctuations in CO levels are deemed to be desirable.

In one example, the controller 122 can supervise the CO detector 102 to determine if the CO detector 102 is properly performing and actively sensing CO. Because the CO detector 102 can become plugged or damaged, it is useful to sense proper operation of the CO detector 102 to avoid an accident.

In some examples, the controller 122 can count CO detector signals that carry a CO level value above a predetermined threshold value (i.e., a minimum noise threshold level) within a predetermined time interval. Because the CO will exist in the environment, no matter if it is desirable or undesirable, by receiving CO value levels over a predetermined level, it will indicate that the CO detector 102 is detecting CO.

In some examples, the minimum noise threshold value is 0 ppm. In other examples, the minimum noise threshold value can range between about 50 and about 150 ppm. In some examples, the controller 122 can use a predetermined time interval between about 5 seconds and 45 seconds to count signals received from the CO detector 102. In other examples, if at least half of the values received by the controller 122 in the predetermined time interval from the CO detector 102 are above the minimum noise threshold, the controller 122 determines the CO detector 102 is actively sensing CO. In some examples, the predetermined time interval is about 30 seconds.

Figure 5:
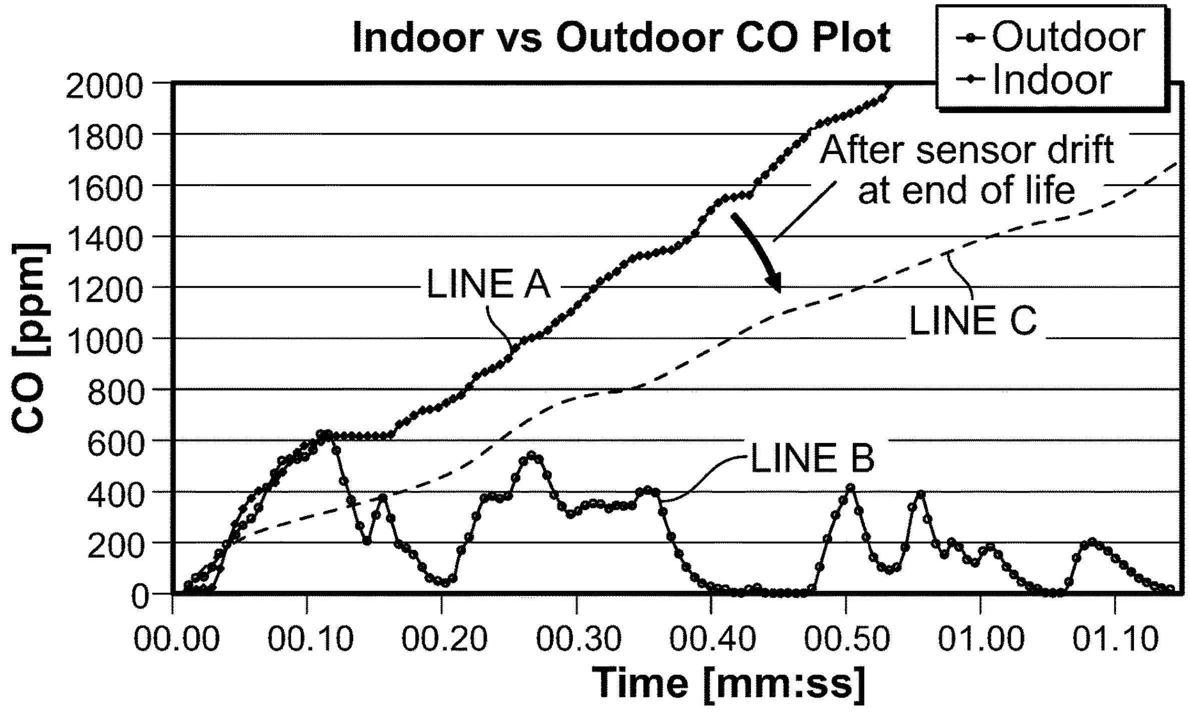
FIG. 5 illustrates another example of a data plot of sensed values provided to a controller by the carbon monoxide detector of FIG. 1.

FIG. 5 shows a chart similar to the chart of FIG. 4. Line A, and points thereon, represents an undesirable environment, and Line B, and points thereon, represents a desirable environment. In some examples, the CO detector 102 can experience sensor drift over time, thereby providing signals to the controller 122 that are not accurate of the actual levels of CO in the environment. This sensor drift is represented in FIG. 5 by Line C. However, because an undesirable environment can be recognized by the controller 122 as a consistent build-up of CO over time, the controller 122 can still accurately recognize an undesirable environment even when the CO detector 102 experiences sensor drift.

In some examples, the controller 122 is configured to determine if the CO detector 102 is providing signals that are representative of a desirable or undesirable environment by using sensing trends in the CO detector 102 data. In some examples, a regression analysis can be used. In such an analysis, the controller 122 gathers a data set of CO detector 102 readings of CO present in the environment over a predetermined time interval. In some examples, the time interval is between about 5 seconds and about 60 minutes. In other examples, the time interval is between about 15 seconds and about tw2o minutes. The controller 122 then formulates a regression line based on the data set. In some examples, the regression line is a linear regression line. Further, once a formula for the regression line is calculated, the controller 122 determines if the slope of the regression line is a positive slope. In some examples, the controller 122 can also determine if the slope of the regression line has a slope over a predetermine threshold value. In some examples, if the slope of the regression line is positive, the controller 122 determines that there is CO build-up occurring that could lead to, or is creating, an undesirable environment. By determining the slope of the regression line over time, the controller 122 helps to minimize false alarms triggered by intermediate spikes in CO detected by the CO detector. Further, determining the slope of the regression line over time allows the controller 122 to determine CO trends, thereby helping the controller 122 to more quickly, and more accurately, recognize an undesirable environment.

In some examples, the controller 122 is configured to dynamically alter the minimum noise threshold and/or the CO build-up trend value (i.e. slope) that triggers a shutdown based on a variety of variables. In one example, the controller 122 can use a predetermined, or measured, emission rate of the engine 104 to alter the minimum noise threshold of CO and/or the CO build-up trend value, thereby altering when the controller 122 ceases operation of the engine 104. In some examples, the controller 122 can store the last measured CO level value/trend when the generator 100 shuts down. In some examples, by storing the last known CO value/trend, the controller 122 becomes calibrated to a particular environment. Upon restart of the generator 100, the controller 122 is capable of sensing a CO build-up in a more responsive manner. In some examples, the controller 122 can alter the minimum noise threshold and/or the CO build-up trend value based on historic values sensed at the CO detector 102. This can be advantageous in a confined space, such as a particular worksite, as it allows the controller 122 to become more sensitive to changes in CO levels in an environment where relatively small CO level changes can have a potentially harmful impact (i.e., potentially limited ventilation). In some examples, the controller 122 can determine when to rely on the last measured CO level value/trend by using a timer and/or other sensor (accelerometer, etc.) to indicate the likelihood of the generator 100 being moved to a different environment.

Figure 6:
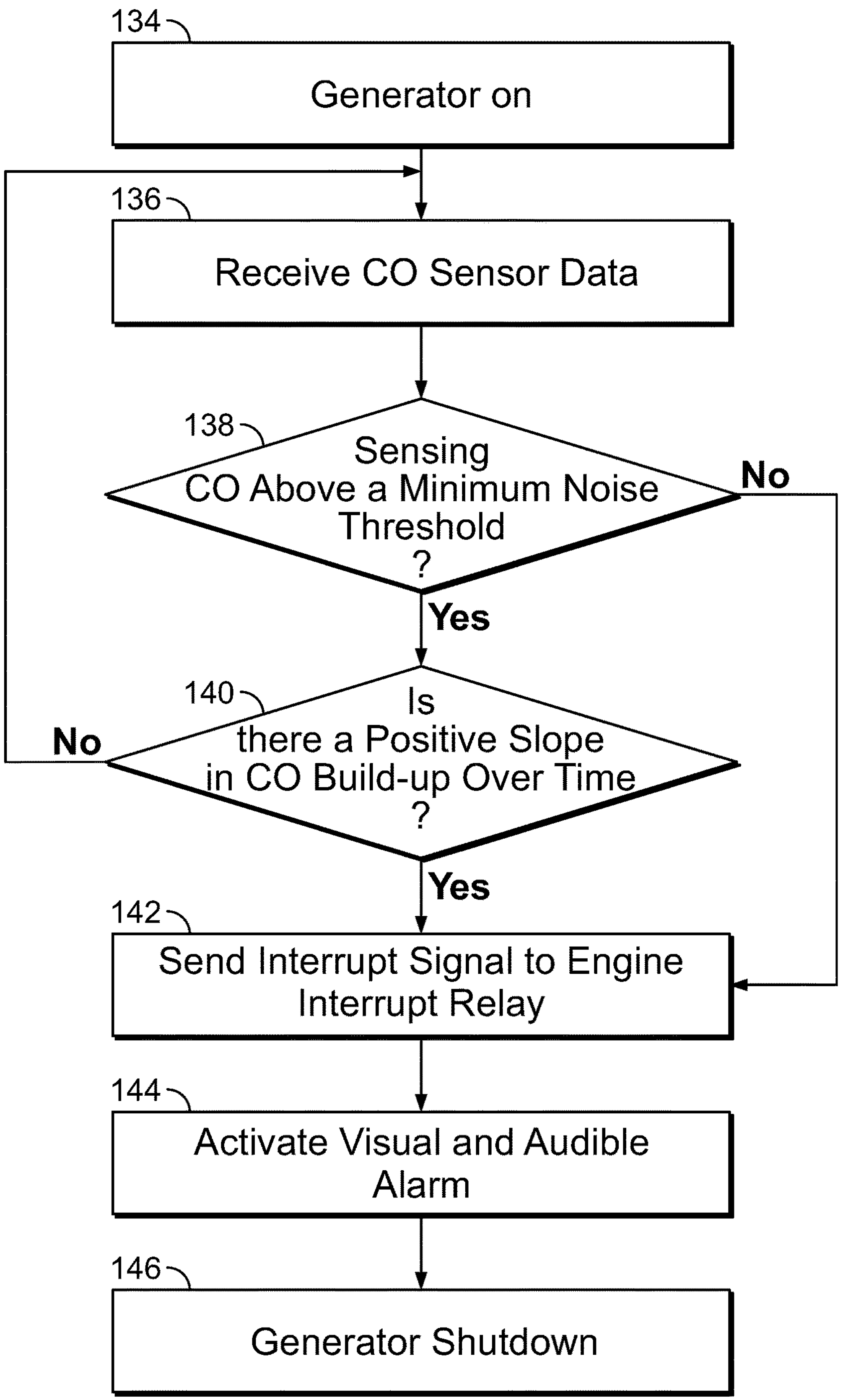
FIG. 6 illustrates a flow chart of the operation of an example controller in communication with the generator and carbon monoxide detector of FIG. 1.

FIG. 6 shows a flowchart of the controller 122's operation. At step 134, the generator 100 is started and turned on so that the generator is operating. At step 136, the controller 122 receives CO detector 102 data in the form of CO detector signals 120 for a predetermined time interval. The controller 122 then determines at step 138 if the CO detector signals 120 received from the CO detector 102 are above a predetermined minimum noise threshold over a predetermined time interval (noise level). This analysis can be the analysis described with respect to FIG. 4, above. If the controller 122 determines that the CO detector signals 120 are indeed above a predetermined threshold, the controller 122 proceeds to determining if the environment is either desirable or undesirable, at step 140. However, if the controller 122 determines that the CO detector signals 120 are not above a predetermined threshold, the controller 122 immediately proceeds to step 142 and uses the engine interrupt circuit to terminate the operation of the generator 100 at step 146. In some examples, the controller 122 stops sending a powered signal 126, thereby putting the engine interrupt circuit 132 into the non-powered state, terminating engine operation. Simultaneously, in some examples, at step 144, the controller 122 can also activate the visual alarm (e.g., activate the red light on the visual indicator 128) and audio alarm 130. Steps 142, 144, and 146 can all occur nearly simultaneously.

If at step 138, the controller 122 determines the CO detector signals 120 are above a predetermined threshold, at step 140 the controller 122 determines if the environment is desirable or undesirable. This analysis can be the analysis described with respect to FIG. 5, above. The controller 122 determines if there is a positive trend in CO build-up. This can be accomplished by, for example, determining if there exists a positive slope in the data received from the CO detector 102. If the slope is positive, the controller proceeds to steps 142, 144, and 146, thereby terminating the operation of the generator 100. If the slope is not positive, or under a predetermined slope threshold, the controller 122 performs a loop and returns to step 136. At this point, the controller 122 will be performing the loop of steps 136, 138, 140, 136 . . . and on until the controller 122 determines at step 140 that an undesirable environment exists.

In some examples, as mentioned above, the accuracy of the CO detector 102 can deteriorate. This can be caused by the passage of a certain amount of time, overexposure to high CO levels, or overexposure to the elements. While the controller 122 is configured to accurately predict an undesirable environment even after the CO detector 102 has experienced sensor drift by relying on trends in the measured CO values, and not specific values, it is still advantageous to provide feedback to the user that the CO detector 102 should be serviced or replaced to ensure the most accurate readings and operation.

In some examples, the controller 122 can rely on the additional sensor 103 to provide signals to the controller 122. The at least one additional sensor 103 can be one of, but not limited by, a temperature sensor, a humidity sensor, a proximity sensor, an accelerometer, and/or a timer. In some examples, the generator 100 can include a plurality of additional sensors. In other examples still, the additional sensors can be packaged with the CO detector 102.

In some examples, the controller 122 can use signals received from the sensor 103 to determine if the CO detector 102 has been either overexposed and/or is in need of replacement. In some examples, the controller 122 can use signals from the sensor 103 to alter predetermined thresholds (i.e. the minimum noise threshold and a shutoff thresholds). In other examples, the sensor 103 is a sensor (e.g., a proximity sensor) that senses the location of a structure/obstacle near the generator 100. For example, the sensor 103 can sense when the generator 100 is placed too close to a structure to allow for proper ventilation (i.e., a wall, ceiling, etc.). In some examples, the sensor 103 can be positioned near the exhaust outlet of the generator 100 to sense undesirable obstructions near the exhaust outlet. In some examples, the sensor 103 is configured to sense if an obstacle is present around the generator 100. In some examples, the sensor 103 can communicate with the controller 122 to cease operation of the generator if a particular environment is sensed. In some examples, the sensor 103 can provide feedback to the controller 122 to alter a CO threshold at which the controller 122 ceases operation of the generator 100. For example, if the sensor 103 senses the generator is in a confined space, the controller 122 can alter the thresholds so that the controller 122 ceases operation of the generator 100 at a lower than normal CO operating level. This results in a more sensitive system due to the more dangerous environment of a confined space.

In some examples, the controller 122 uses the sensor 103 to determine if the generator 100 is in an outdoor or indoor environment. For example, if an indoor environment is sensed by the sensor 103, the controller 122 can adjust a plurality of shutoff thresholds (discussed below) accordingly to make the generator more sensitive to CO levels.

In other examples, a temperature sensor is used as the sensor 103. In some examples, the controller 122 can alter the shutoff thresholds based on a sensed temperature to account for the behavior of the CO detector to sense CO levels differently in different temperature environments. In some examples, the controller 122 uses a temperature to sensor as sensor 103 to determine if the generator 100 is in an outdoor or indoor environment. For example, if a steady temperature rise is seen, such a rise can be indicative of indoor environment as the generator's 100 operation (i.e. output of heat) may raise steadily raise an indoor environment's ambient temperature. If an indoor environment is sensed by the sensor, the controller 122 can adjust the shutoff thresholds accordingly to make the generator more sensitive to CO levels.

When using a temperature sensor, the controller 122 can determine if the CO detector 102 has been exposed to extreme environments, such as extreme cold or extreme heat. Such extreme temperatures may damage the components of the CO detector 102 and thereby render it inaccurate or inoperable. In some examples, the controller 122 is programmed with predetermined temperature thresholds. In some examples, the lower threshold is between about (−)40 degrees and about (−)4 degrees Fahrenheit and the upper threshold is between about 104 degrees and about 158 degrees Fahrenheit. In other examples, the controller 122 can control the operation of a heating element (not shown) positioned proximate the CO detector 102 when the measured temperature is below a predetermine threshold.

When using a humidity sensor, the controller 122 can determine if the CO detector 102 has been exposed to extremely humid environments where the moisture in the air may condense and damage the CO detector 102.

When using the timer, the controller 122 can monitor the overall time that the CO detector 102 has been used (i.e., age and/or operating time). In some examples, the timer can be a function of, and integral with, the controller 122 or it can be a standalone component. Further, in conjunction with the temperature sensor and humidity sensor, the controller 122 can utilize the timer to monitor the amount of time that the CO detector 102 has been exposed to extreme temperature environments and/or extremely humid environments.

The steps shown in FIG. 6 can be performed in the order shown, performed in a different order than shown, performed excluding select steps, and/or performed including additional steps.

Figure 7:
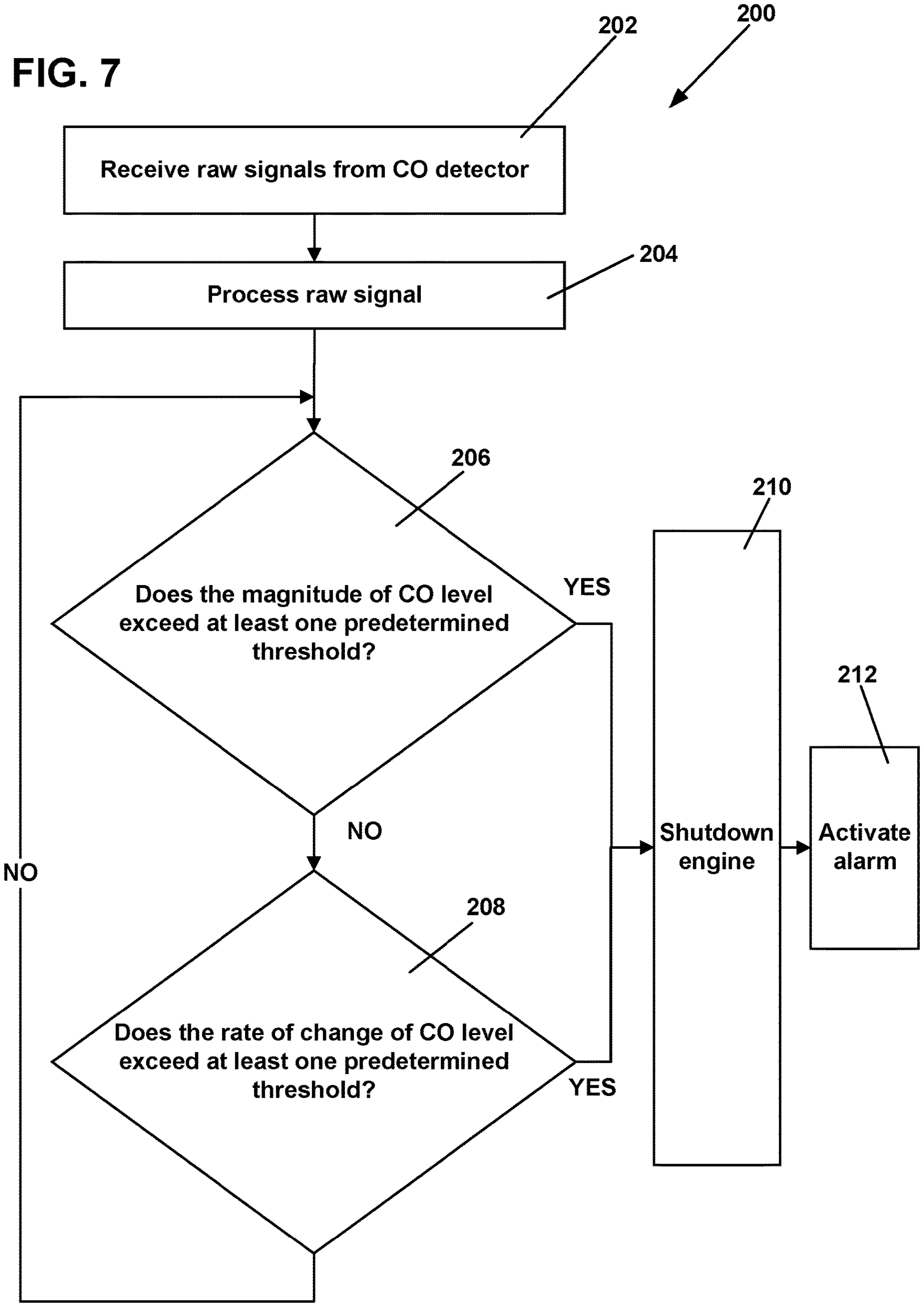
FIG. 7 illustrates a flow chart of another example operation of a controller in communication with the generator and carbon monoxide detector of FIG. 1.

FIG. 7 shows an example operation 200 of the controller 122. In some examples, the operation 200 can be performed in place of step 140, shown in FIG. 6. In some examples, the operation 200 can be performed by the controller 122 in addition to determining if the CO detector 102 is sensing above a minimum noise threshold.

At step 202 of the operation 200, the controller 122 receives raw signals from the CO detector 102. At step 204, the controller 122 processes the raw signals. In some examples, as part of processing the raw signals, the controller 122 filters the raw signals. Once the controller 122 has processed the raw signals, the controller 122 determines if the magnitude (step 206) and/or the rate of change (step 208) of the measured levels of CO by the CO detector 102 exceed predetermined threshold values. If the CO levels do exceed predetermined threshold values, the controller 122 commences the shutdown on the engine at step 210 (e.g., by using the engine interrupt circuit 132). When shutdown is commenced, the controller 122 can also activate, at step 212, at least one of the visual and audio alarms 128, 130.

The steps shown in FIG. 7 can be performed in the order shown, performed in a different order than shown, performed excluding select steps, and/or performed including additional steps.

Figure 8:
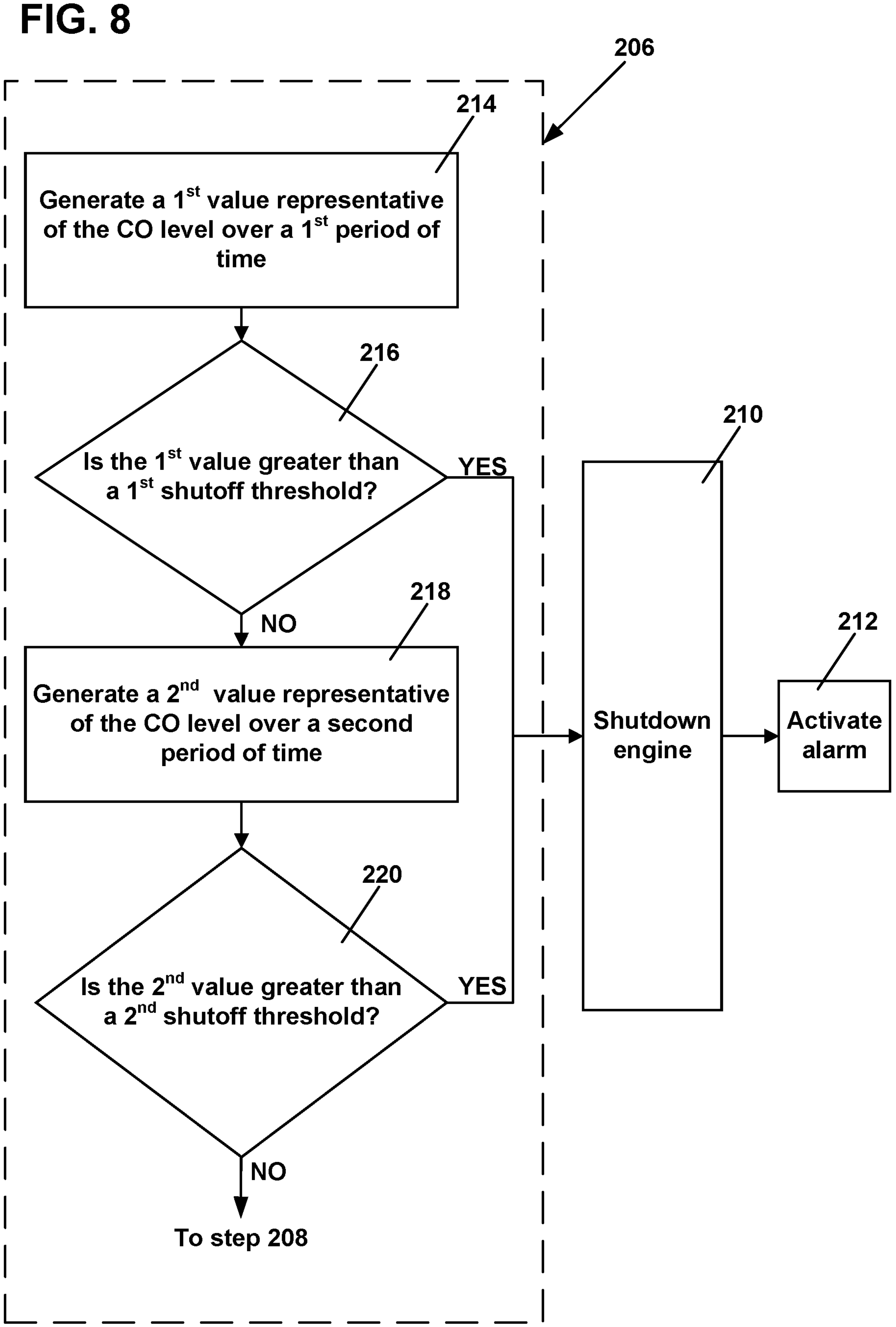
FIG. 8 illustrates a flow chart of another example operation of the controller of FIG. 7.

FIG. 8 shows a detailed example of the magnitude analysis of step 206. At step 214, the controller 122 generates a first value that is representative of the CO level over a first period of time. In some examples, the first period of time is between 0 and 45 seconds. In some examples, the first period of time is 30 seconds. In some examples, the first value can be a variety of different values based on the CO signals. For example, the first value can be a mean, a median, a mode, or any other variety of values based on the CO signals received from the CO detector 102.

At step 216, the controller 122 determines if the first value is greater than a first shutoff threshold. In some examples, a mean of the CO signals over 30 seconds is used for the first value and the first shutoff threshold is between 650 PPM and 750 PPM. In some examples, the first shutoff threshold is about 700 PPM. If the controller 122 determines the first value is greater than the first shutoff threshold, the controller 122 initiates an engine shutdown 210 and/or activates at least one of the visual and audio alarms 128, 130.

At step 218, the controller 122 generates a second value that is representative of the CO level over a second period of time. In some examples, the second period of time is between 5 minutes and 15 minutes. In some examples, the second period of time is about 10 minutes. In some examples, the second value can be a variety of different values based on the CO signals. For example, the second value can be a mean, a median, a mode, or any other variety of values based on the CO signals received from the CO detector 102. In some examples, the second value can be based on the first value. For example, the second value can be a mean of the first value over the second period of time.

At step 220, the controller 122 determines if the second value is greater than a second shutoff threshold. In some examples, a mean of the CO signals over 10 minutes is used for the second value and the second shutoff threshold is between about 300 PPM and 400 PPM. In some examples, the second shutoff threshold is about 350 PPM. If the controller 122 determines the second value is greater than the second shutoff threshold, the controller 122 initiates an engine shutdown 210 and/or activates at least one of the visual and audio alarms 128, 130.

The steps shown in FIG. 8 can be performed in the order shown, performed in a different order than shown, performed excluding select steps, and/or performed including additional steps.

Figure 9:
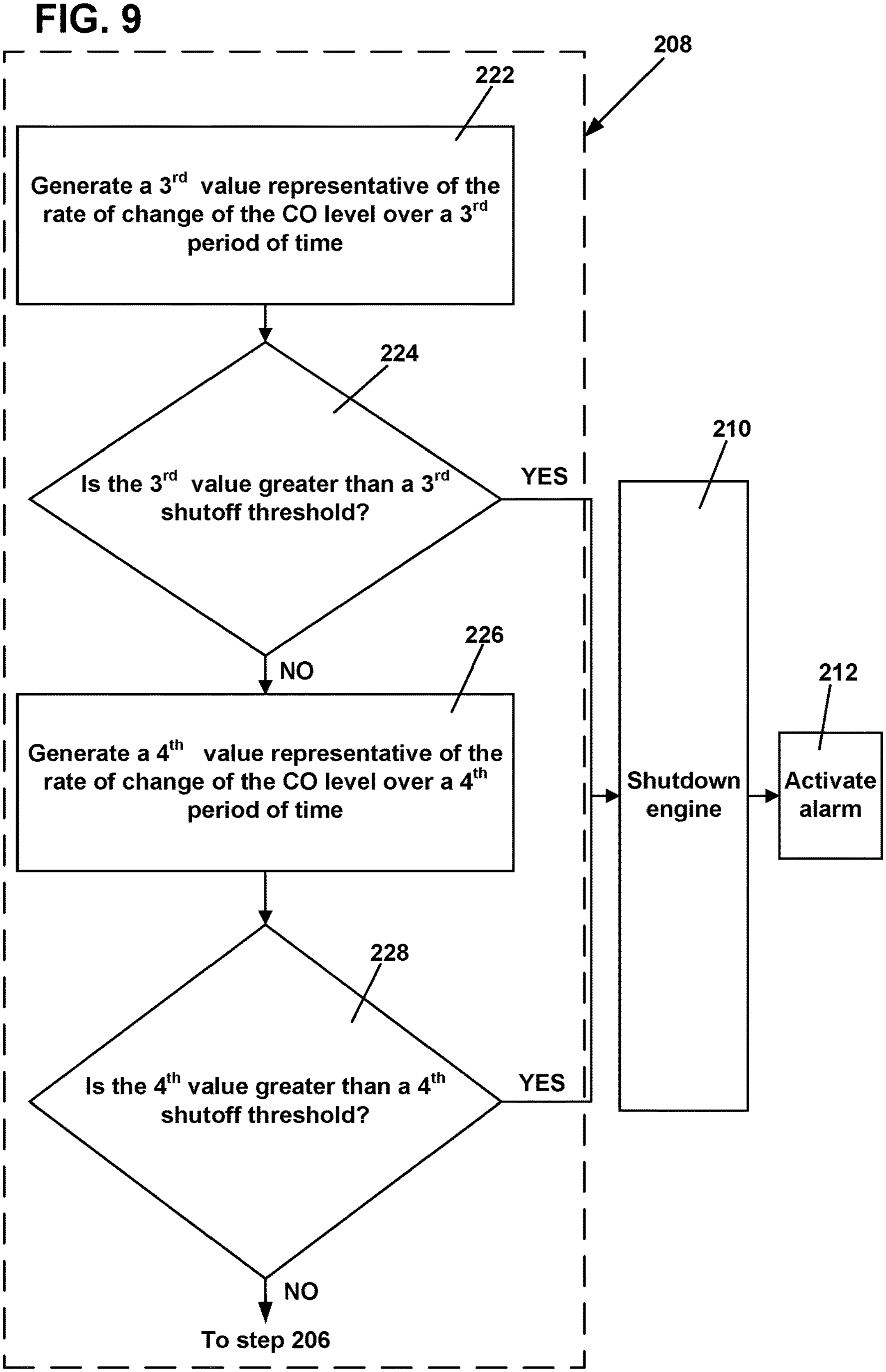
FIG. 9 illustrates a flow chart of another example operation of the controller of FIG. 7.

FIG. 9 shows a detailed example of the rate of change analysis of step 208. In some examples, the controller 122 can use PID and/or other similar programming to perform step 212. At step 222, the controller 122 generates a third value that is representative of the rate of change of the CO level over a third period of time. In some examples, the third period of time is between 0 and 1 second. In some examples, the third period of time is 1 second. In some examples, the third value can be a variety of different values that illustrate a rate of change of the CO signals. For example, the third value can be a slope, an acceleration, or any other value that is illustrative of a rate of change of CO levels based on the CO signals received from the CO detector 102.

At step 224, the controller 122 determines if the third value is greater than a third shutoff threshold. In some examples, an acceleration per second squared is used for the third value and the third shutoff threshold is between about 5 PPM/sec$^2$ and 15 PPM/sec$^2$. In some examples, the third shutoff threshold is about 10 PPM/sec$^2$. If the controller 122 determines the third value is greater than the third shutoff threshold, the controller 122 initiates an engine shutdown 210 and/or activates at least one of the visual and audio alarms 128, 130 and step 212.

At step 226, the controller 122 generates a fourth value that is representative of the rate of change of the CO level over a fourth period of time. In some examples, the fourth period of time is between about 15 seconds and 45 seconds. In some examples, the fourth period of time is about 30 seconds. In some examples, the fourth period of time is greater than 30 seconds. In some examples, the fourth value can be a variety of different values that illustrate a rate of change of the CO signals. For example, the fourth value can be a slope, an acceleration, or any other of a variety of values that illustrate a rate of change of CO levels based on the CO signals received from the CO detector 102. In some examples, the fourth shutoff threshold is within the range of 0.5 PPM/sec$^2$ and 1.5 PPM/sec$^2$. In some examples, the fourth shutoff threshold is about 1.0 PPM/sec$^2$.

At step 228, the controller 122 determines if the fourth value is greater than a fourth shutoff threshold. In some examples, an acceleration per second squared over 10 seconds is used for the fourth value and the fourth shutoff threshold is within the range of 0.5 PPM/sec$^2$ and 1.5 PPM/sec$^2$. In some examples, the fourth shutoff threshold is about 1.0 PPM/sec$^2$. If the controller 122 determines the fourth value is greater than the fourth shutoff threshold, the controller 122 initiates an engine shutdown 210 and/or activates at least one of the visual and audio alarms 128, 130 and step 212.

The steps shown in FIG. 9 can be performed in the order shown, performed in a different order than shown, performed excluding select steps, and/or performed including additional steps.

Figure 10:
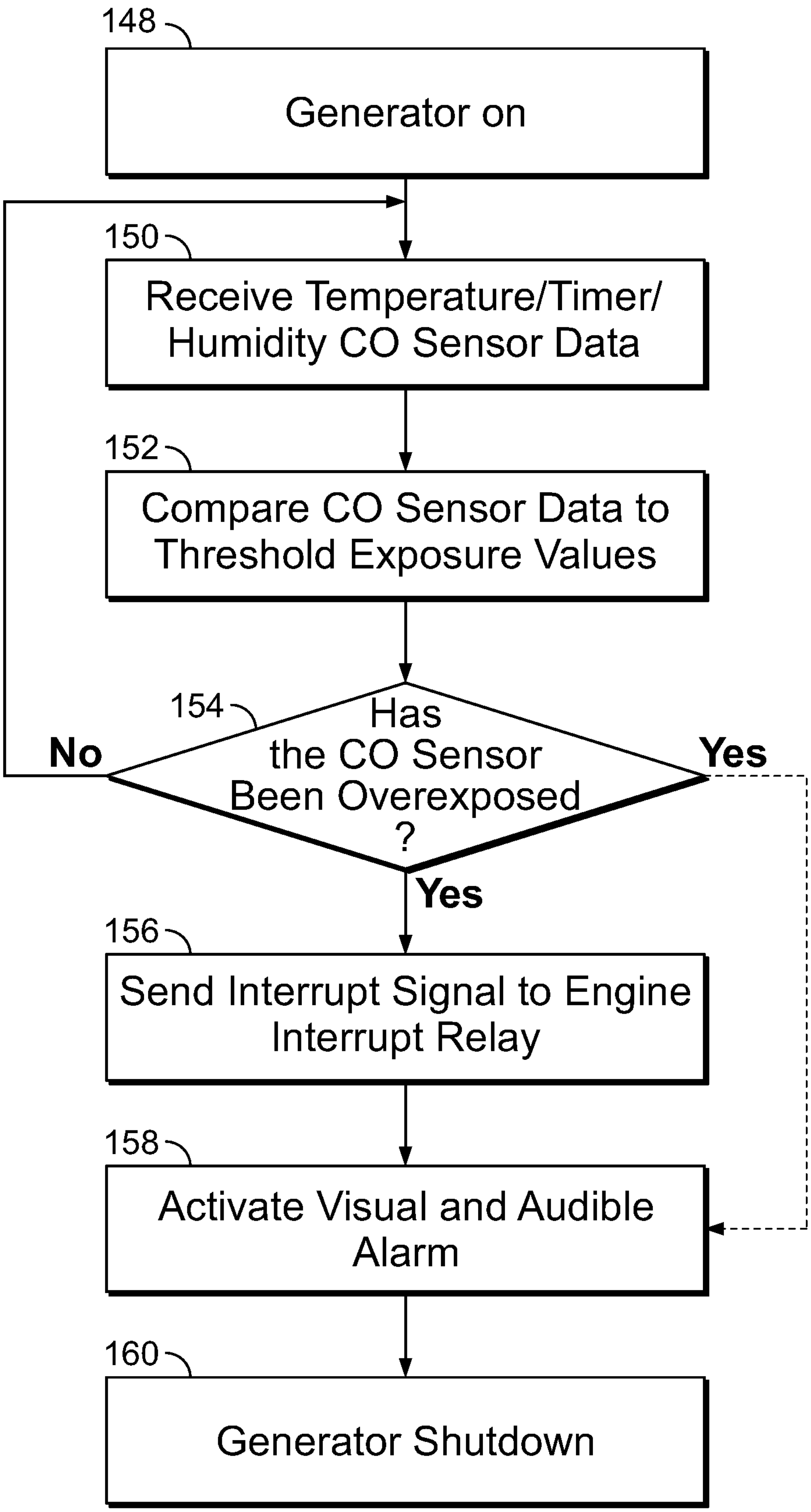
FIG. 10 illustrates another flow chart of the operation of an example controller in communication with the generator and carbon monoxide detector of FIG. 1.

FIG. 10 shows a flowchart of an example operation performed by the controller 122. At step 148, the generator 100 is turned on so that it is operating. The controller 122 then receives data from the at least one additional sensor at step 150 and compares that data to predetermined threshold values at step 152. If the controller 122 determines the measured values have exceeded the predetermined threshold values, which would indicate damage to the CO detector 102, at step 154, the controller 122 communicates with the engine interrupt circuit 132 at step 156, activates the visual and audio alarms at step 158, and terminates the generator 100 operation at step 160.

Alternatively, in some examples, after determining the measured values have exceeded the predetermined threshold, the controller 122 can simply activate the visual and audio alarms at step 158 and allow the generator 100 to continue to operate. For example, this operation can take place when the controller 122 determines the measured values have not yet exceeded the threshold values by a large enough magnitude to render the CO detector 102 inaccurate enough. This can provide the user with the useful information that the CO detector 102 should be replaced but does not terminate their immediate use of the generator 100.

If the controller 122 determines that the data from the at least one additional sensor does not surpass the threshold levels, the controller 122 performs a loop, and returns to step 150.

Figure 11:
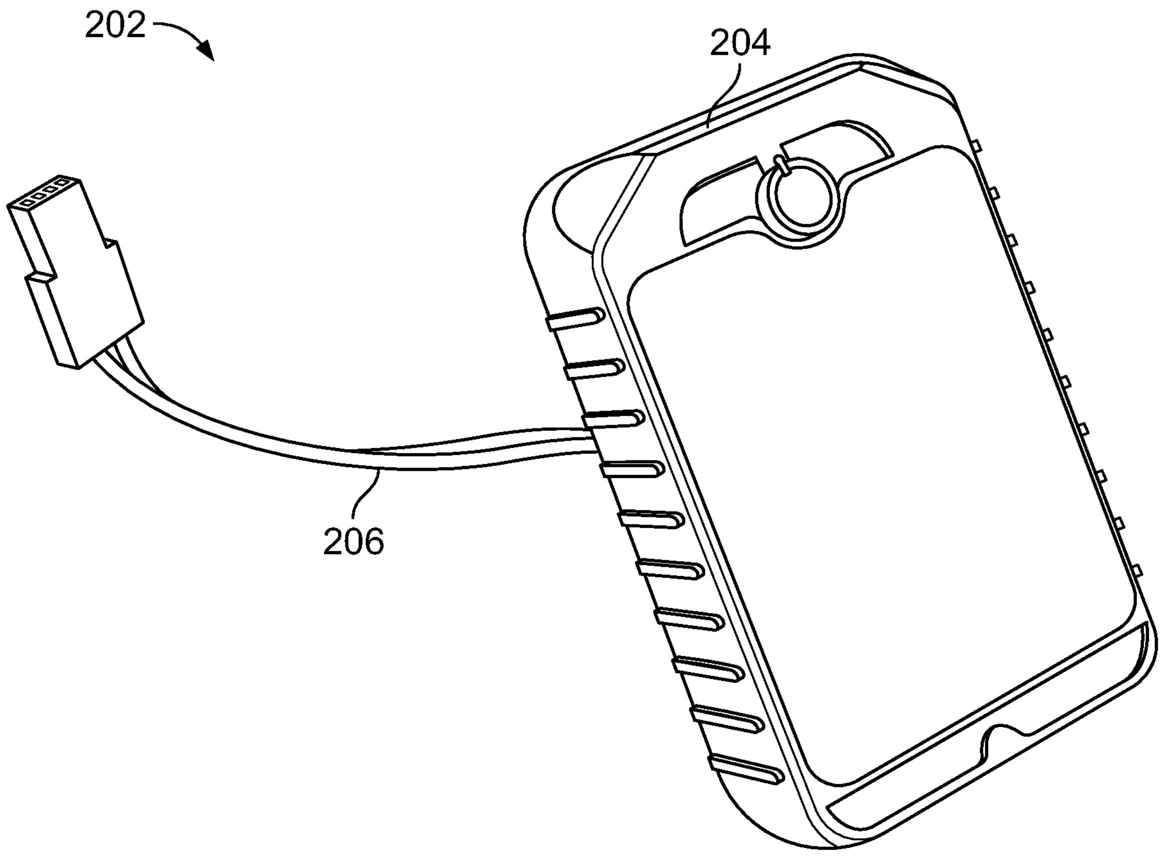
FIG. 11 illustrates an isometric view of an example of a carbon monoxide detector, according to one embodiment of the present disclosure.

FIG. 11 shows an isometric view of an example CO detector 202. The CO detector 202 can be configured to be installed by a manufacturer with the generator 100 (or like machine) or it can be configured to be installed as an add-on component to a preexisting generator (or like machine). The CO detector 202 includes a housing 204 and a pigtail connector 206. In some examples, the housing 204 contains the controller 122. In other examples still, the housing 204 contains at least one additional sensor such as a temperature sensor, humidity sensor, and/or timer. In some examples, the housing 204 can be tamper-proof, thereby limiting the operation of the attached machine (e.g., the generator 100) if components are moved or removed.

In some examples, the pigtail connector 206 can be plugged into a preexisting engine interrupt circuit located on the generator 100. For example, a preexisting engine interrupt circuit can be a low oil engine interrupt circuit and/or a fuel delivery system on the generator 100.

Figure 12:
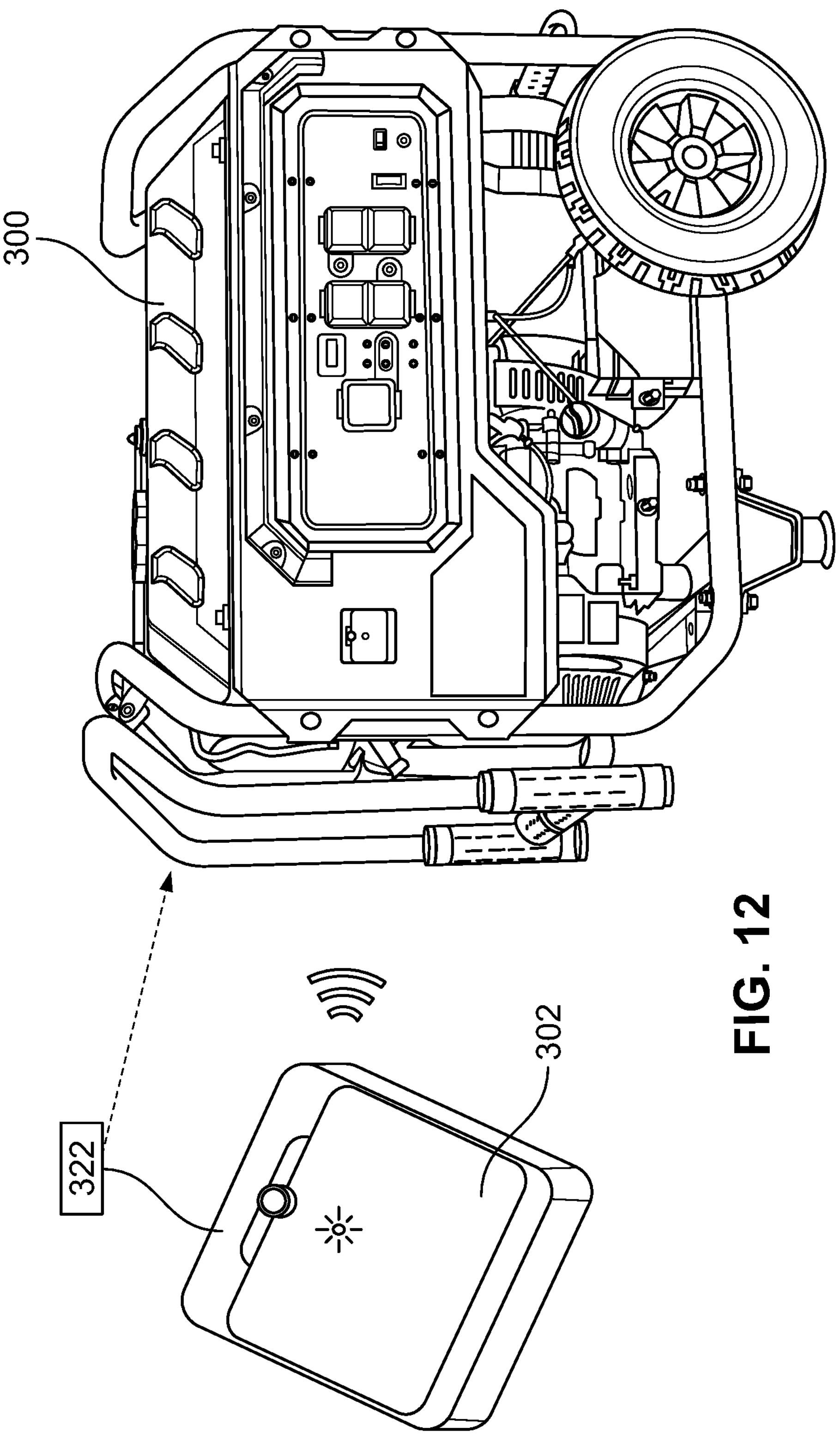
FIG. 12 illustrates an isometric view of an example of a carbon monoxide detector and generator, according to one embodiment of the present disclosure.

FIG. 12 shows a schematic representation of an example generator 300 and an example CO detector 302. The CO detector 302 is substantially similar to the CO detectors 102 and 202 described above. The CO detector 302 and associated controller 322 are capable of preforming in a similar way as the controller 122 and CO detectors 102, 202 described above. The CO detector 302 is configured to be wirelessly connected to the generator 300 to allow it to be placed away from the generator 300 in an environment. In some examples, the generator 300 can communicate with a plurality of CO detectors 302 so that the controller 322 can control the operation of the generator 300 based on signals from the CO detector(s) 302.

Figure 13:
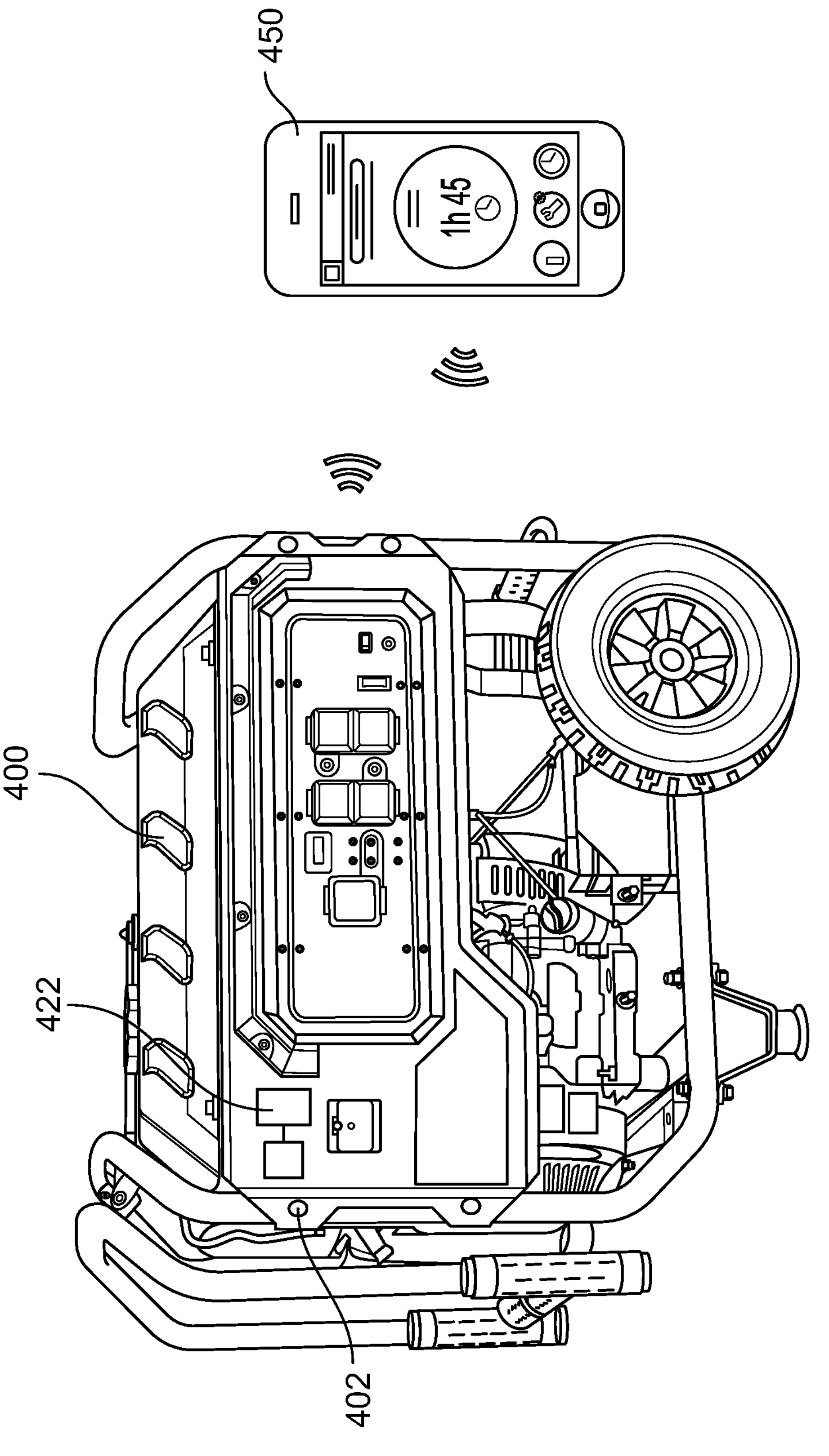
FIG. 13 illustrates an isometric view of an example of a carbon monoxide detector, a controller, a generator, and a mobile device according to one embodiment of the present disclosure.

FIG. 13 shows an example generator 400 that can wirelessly communicate with a mobile device 450. The generator 400 can include an onboard CO detector 402 in communication with an onboard controller 422, both of which are substantially similar to the CO detectors 102, 202, 302 and controller 122 described above. In some examples, the generator 400 can be in communication with a wireless CO detector 402. In some examples, the mobile device 450 can communicate with the controller 422 to receive alarms and data that are representative of the generator 400's operation and also the data received from the CO detector 402. The controller 422 can include a wireless module, such as a Bluetooth® module or a Wi-Fi module for communicating with the mobile device 450. In some examples, the controller 422 communicates signals with the mobile device 450 that are representative of a CO level proximate to the generator 400. In some examples, the controller 422 can also be in communication with a secondary sensor (e.g., the additional sensor 103 and/or wireless CO detector 302 described above) placed in the environment near the generator 400 so that the controller 422 can communicate CO levels to the mobile device 450 that are representative of the environment proximate to the generator 400. For example, a user can monitor CO levels of the environment proximate to the generator 400 from a safe distance. In some examples, the controller 422 communicates with the mobile device when CO levels in the environment proximate to the generator 400 have decreased below a predetermined threshold.

Figure 14:
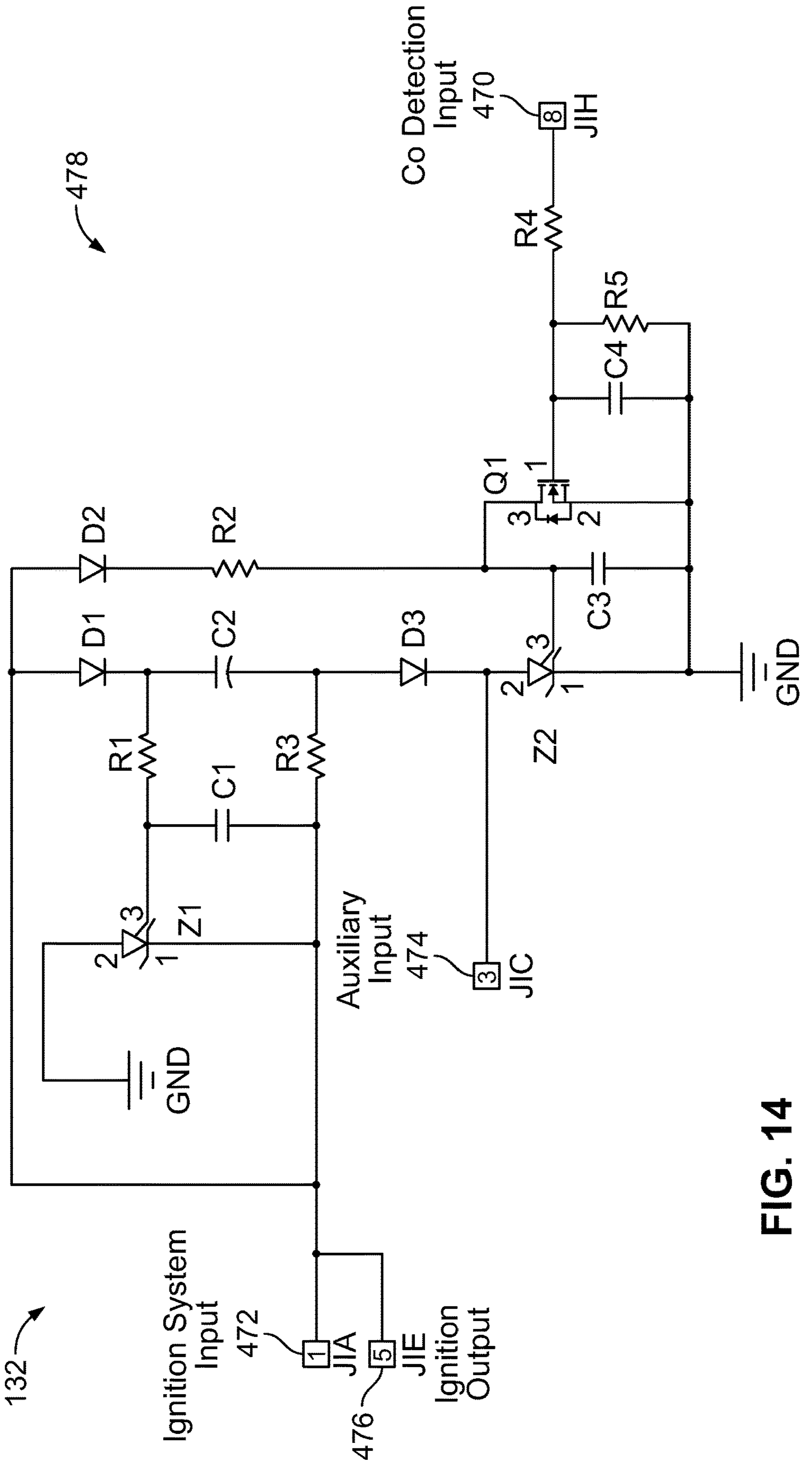
FIG. 14 illustrates an example of an engine interrupt circuit, according to one embodiment of the present disclosure.

FIG. 14 is a schematic diagram illustrating an example of the engine interrupt circuit 132 (shown in FIG. 3) for inhibiting the operation of generator 100 under certain conditions detected by CO detection circuitry (such as the CO sensor 102 and the controller 122, shown in FIG. 3).

In this example, the engine interrupt circuitry 132 includes a CO detection input 470, an ignition system input 472, an auxiliary input 474, an ignition output 476, and electronic components 478. In the illustrated example, the electronic components include diodes D1, D2, and D3; resistors R1, R2, R3, R4, and R5; capacitors C1, C2, C3, and C4; and switching components Z1, Z2, and Q1. Ground connections are also illustrated.

The CO detection input 470 receives a signal generated by the CO detection circuitry. In normal operation, the signal is a positive voltage. One advantage of requiring a positive voltage be generated by the CO detection circuitry during normal operation is that it prevents the generator 100 from operating if the CO detection circuitry is removed.

When the positive voltage is provided by the CO detection circuitry, the switching component Q1 is turned on, which in turn turns off the switching component Z2. When in this state, the switching component Z1 disconnects the ignition system input 472 from the ground connection connected to switching component Z1, which allows the ignition signal at the ignition output 476 to operate the engine 104 of the generator 100.

When an undesirable CO event is detected, the signal from the CO detection circuitry is switched to ground, which turns off the switching component Q1 and turns on the switching component Z2.

When Z2 turns on, C2 is permitted to be charged by a positive pulse received from the ignition system 108 at the ignition system input 472. With C2 charged, switching component Z1 is turned on when the pulse from the ignition system begins to go negative. This pulse is then shorted to ground through the switching component Z1, which prevents the operation of the engine 104 of the generator 100.

In some examples, the engine interrupt circuit 132 also includes one or more auxiliary inputs 474. The auxiliary input 474 can be used, for example, to deactivate the engine 104 of the generator 100 for reasons other than an undesirable CO event, in the same manner as the CO detection circuitry. Examples of such other reasons include a low oil condition, an overheat condition, or any other detectable event or condition.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A portable generator comprising:
- an internal combustion engine that generates mechanical power;
- a chassis assembly supporting the internal combustion engine and having a handle for transporting the portable generator;
- an alternator that receives the mechanical power from the internal combustion engine and transforms at least a majority of the mechanical power into electrical energy;
- an output interface that provides the electrical energy to an external device for powering the external device;
- an engine interrupt connected to the internal combustion engine, wherein the engine interrupt is configured to selectively stop the operation of the internal combustion engine;
- a controller in communication with the internal combustion engine and the engine interrupt; and
- a carbon monoxide detector in communication with the controller, wherein the carbon monoxide detector provides the controller with signals that are representative of a carbon monoxide level proximate the internal combustion engine;
- wherein the controller uses the engine interrupt to stop the operation of the engine under one of at least two shut down conditions, both of which are evaluated by the controller, including:
  - a first shutdown condition in which the controller identifies a magnitude value of the signals over a set time interval, and in which the magnitude value exceeds a predetermined shutoff threshold value; and
  - a second shutdown condition in which the controller calculates, for signal values exceeding a minimum noise threshold, a trend line having a rate of change value over a set time interval, and in which the rate of change value is one or both of a positive value or a value that exceeds a predetermined rate of change threshold value.

2. The portable generator of claim 1, wherein the rate of change is a slope or an acceleration of the trend line.

3. The portable generator of claim 1, wherein the magnitude value corresponds to a mean, median, or mode of the signals received over the second time interval.

4. The portable generator of claim 1, wherein the first shutdown condition includes a plurality of sequentially evaluated magnitude values over a plurality of corresponding time intervals.

5. The portable generator of claim 4, wherein the first shutdown condition includes:
- a first magnitude threshold value evaluated over a first set time interval; and
- a second magnitude threshold value evaluated over a second set time interval.

6. The portable generator of claim 5, wherein the first magnitude threshold value is between 650 and 750 parts per million and the first set time interval is between 0 and 45 seconds, and wherein the second magnitude threshold value is between 300 and 400 parts per million and the second set time interval is between 5 and 15 minutes.

7. The portable generator of claim 1, wherein the second shutdown condition includes a plurality of sequentially evaluated rate of change values over a plurality of corresponding time intervals.

8. The portable generator of claim 7, wherein the second shutdown condition includes:
- a first rate of change threshold value evaluated over a first set time interval; and
- a second rate of change threshold value evaluated over a second set time interval.

9. The portable generator of claim 8, wherein the first rate of change threshold value is between 5 and 15 parts per million per second squared and the first set time interval is between 0 and 1 second, and wherein the second magnitude threshold value is between 0.5 and 1.5 parts per million per second squared and the second set time interval is between 15 and 45 seconds.

10. The portable generator of claim 1, wherein the controller monitors carbon monoxide levels and uses a regression analysis to determine the trend line of monitored carbon monoxide levels, and wherein a signal is sent to the engine interrupt by the controller when the slope of a regression line computed by the regression analysis is positive over the set time interval.

11. The portable generator of claim 1, wherein the first set time interval is between about 15 seconds and about 60 minutes.

12. The portable generator of claim 1, wherein the controller is a PID controller.

13. The portable generator of claim 1, wherein the carbon monoxide detector automatically ceases the operation of the internal combustion engine when communication between the carbon monoxide detector and the controller is interrupted.

14. The portable generator of claim 1, further comprising a secondary sensor in communication with the controller, wherein the secondary sensor is at least one of a carbon monoxide sensor, a temperature sensor, a humidity sensor, a proximity sensor, an accelerometer, and a timer.

15. The portable generator of claim 1, wherein the controller alters or both of the minimum noise threshold and the predetermined slope threshold that indicates the trend of building carbon monoxide amounts over the set time interval based on historic signals received from the carbon monoxide detector.

16. The portable generator of claim 1, wherein the carbon monoxide detector is integrated with the internal combustion engine so that, if the carbon monoxide detector is tampered with, the internal combustion engine ceases to operate.

17. A method of operating an internal combustion engine-based system of a portable generator, the method comprising:
- detecting a carbon monoxide level proximate an internal combustion engine using a carbon monoxide detector;
- activating a shutdown action under one of at least two shut down conditions, both of which are evaluated by a controller, including:
  - a first shutdown condition in which a magnitude value of detected carbon monoxide signals, over a set time interval, exceeds a predetermined shutoff threshold value; and
  - a second shutdown condition in which, for signal values exceeding a minimum noise threshold, a rate of change value determined from the detected carbon monoxide signals, over a set time interval, is one or both of a positive value or a value that exceeds a first predetermined rate of change threshold value.

18. The method of claim 17, wherein the rate of change threshold value of the carbon monoxide level is an acceleration of the carbon monoxide level.

19. The portable generator of claim 17, wherein the second shutdown condition includes:
- a first rate of change threshold value evaluated over a first set time interval; and
- a second rate of change threshold value evaluated over a second set time interval.

20. The method of claim 19, wherein the first rate of change threshold value is between 5 and 15 parts per million per second squared and the first set time interval is between 0 and 1 second, and wherein the second magnitude threshold value is between 0.5 and 1.5 parts per million per second squared and the second set time interval is between 15 and 45 seconds.

21. The method of claim 17, further comprising activating at least one of a visual and audio alarm when the at least one predetermined shutoff threshold or the predetermined rate of change threshold value is exceeded.

22. The method of claim 17, further comprising determining whether the at least one predetermined shutoff threshold or the predetermined rate of change threshold value is exceeded by additionally using signals received from an additional sensor.

23. The method of claim 17, further comprising determining whether the at least one predetermined shutoff threshold or the predetermined rate of change threshold value is exceeded by additionally using historic signals received from the carbon monoxide detector.

24. A data storage device storing data instructions that, when executed by a controller of a carbon monoxide detector, causes the controller to:
- receive an indication of a carbon monoxide level over a period of time from a carbon monoxide detector proximate an internal combustion engine; and
- activate a shutdown action under one of at least two shut down conditions, both of which are evaluated by the controller, including:
  - a first shutdown condition in which a magnitude value of detected carbon monoxide signals, over a set time interval, exceeds a predetermined shutoff threshold value; and
  - a second shutdown condition in which, for signal values exceeding a minimum noise threshold, a rate of change value determined from the detected carbon monoxide signals, over a set time interval, is one or both of a positive value or a value that exceeds a first predetermined rate of change threshold value.

25. The data storage device of claim 24, wherein the second shutdown condition includes:
- a first rate of change threshold value evaluated over a first set time interval; and
- a second rate of change threshold value evaluated over a second set time interval.

26. The data storage device of claim 25, wherein the first rate of change threshold value is between 5 and 15 parts per million per second squared and the first set time interval is between 0 and 1 second, and wherein the second magnitude threshold value is between 0.5 and 1.5 parts per million per second squared and the second set time interval is between 15 and 45 seconds.

* * * * *